United States Patent
Kubo et al.

(10) Patent No.: US 7,324,141 B2
(45) Date of Patent: Jan. 29, 2008

(54) IMAGE SENSING APPARATUS AND DATA PROCESSING METHOD USED THEREIN

(75) Inventors: Ryoji Kubo, Chiba (JP); Junichi Maniwa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 777 days.

(21) Appl. No.: 10/660,871

(22) Filed: Sep. 11, 2003

(65) Prior Publication Data

US 2004/0046873 A1    Mar. 11, 2004

(30) Foreign Application Priority Data

Sep. 11, 2002   (JP)   ............... 2002-265758
Sep. 11, 2002   (JP)   ............... 2002-265759

(51) Int. Cl.
*H04N 5/76*   (2006.01)
(52) U.S. Cl. ............... 348/231.99
(58) Field of Classification Search ........... 348/231.99, 348/222.1
See application file for complete search history.

(56) References Cited

U.S. PATENT DOCUMENTS

| 5,016,107 | A | * | 5/1991 | Sasson et al. ........... 348/231.1 |
| 6,031,964 | A | * | 2/2000 | Anderson ................. 386/117 |
| 6,278,447 | B1 | * | 8/2001 | Anderson ................. 715/723 |
| 7,199,829 | B2 | * | 4/2007 | Matsui et al. .......... 348/333.02 |
| 2001/0020979 | A1 | * | 9/2001 | Lathrop ..................... 348/222 |

FOREIGN PATENT DOCUMENTS

| EP | 1133167 A1 | * | 9/2001 |
| EP | 1152589 A2 | * | 11/2001 |
| JP | 2001-251551 A | | 9/2001 |

* cited by examiner

*Primary Examiner*—David Ometz
*Assistant Examiner*—Tuan Le
(74) *Attorney, Agent, or Firm*—Morgan & Finnegan, LLP

(57) ABSTRACT

An image sensing apparatus comprises an image sensor that performs image sensing in response to an inputted image sensing instruction, a recording medium that stores a sensed image, and a controller that controls to record on the recording medium the sensed image in a first format instead of a second format, different from the first format, which is designated in advance when a format change instruction is designated by a user within a predetermined period after sensing the image.

43 Claims, 14 Drawing Sheets

IMAGE SENSING APPARATUS AND DATA PROCESSING METHOD USED THEREIN

FIELD OF THE INVENTION

The present invention relates to an image sensing apparatus and a data processing method used in the image sensing apparatus, and particularly to an image sensing apparatus capable of converting a sensed image into electrical signals and recording it as image data on a detachable recording medium, and a data processing method to be used in the image sensing apparatus.

BACKGROUND OF THE INVENTION

Conventionally, in an image sensing apparatus such as an electronic camera which converts an optical image of an object into electrical signals and records the signals as image data on a recording medium, the image sensing operation has been performed as described below.

First, when an image sensing/recording command is inputted by a switch (SW) and the like, a shutter is driven to expose an image sensing device, and then image signals accumulated in the image sensing device are read out after exposing the image sensing device for a proper period. The image signals from the image sensing device are converted into image data by an A/D converter and stored in a memory. Here, "RAW image data" refers to image data, obtained from the image signals from the image sensing device, which has not undergone image processing such as lossy compression.

After that, the RAW image data stored in the memory is read out again, and necessary signal processings are performed for the image based on a predetermined image quality setting to generate image data composed of R, G, and B values, for example. Lossy compression typified by JPEG (Joint Photographic Experts Group) coding is then performed for the image data to generate compressed image data, and the compressed image data is stored in a recording medium (the recording format is hereinafter referred to as an lossy compression format). In this way, a limited recording capacity of a recording medium is efficiently utilized.

In a conventional electronic camera, the compressed image data is expanded and the size of the image is changed (resized) to be suitable for display on a display unit, and then the sensed image is displayed on the display unit so that the sensed image can be viewed immediately after it is sensed. Further, after sensing an image/images, a playback operation is executed by changing the operation mode of the electronic camera to a playback mode. In the playback mode, the compressed image data is also expanded and resized to be displayed on the display unit.

Since the image sensing operation and the playback operation are performed as described above in a conventional electronic camera, a desired image may not be obtained when an image processing parameter such as image quality setting used for image processing is improper, that is, when a predetermined image quality setting and the like are not suitable.

There is also a problem that sufficient image quality may not be obtained when the image is playbacked, if lossy compression has been performed on image data. Furthermore, there is also a problem that, even if uncompressed image data is recorded on a recording medium, it may be difficult for a user to perform image processing on the uncompressed image data read out from a recording medium because processing such as white balancing has been performed at the above-mentioned process upon generating image data by performing signal processing on RAW image data.

One of formats for recording a sensed image to solve the above-mentioned problems is RAW format in which RAW image data, digital data of respective pixels read out from an image sensing device, is stored in a recording medium as it is. The RAW format can be said to be an advantageous recording format which provides a user with freedom of performing image processing after sensing an image.

However, RAW image data is not compressed or, if compressed, in a lossless compression format of low compression rate. Therefore, there is a problem in that, as pixel density of an image sensing device is increased and precision of an A/D converter is improved (increase in the number of bits) recently, RAW image data of one image increases in amount, thereby making it inconvenient to record the data in a capacity-limited recording medium. One way to cope with the increase in data amount is that a user carries a mass storage recording medium or multiple recording media. However, a cost burden on the user is naturally caused and longer time required for recording impairs comfortable image sensing activity.

As a countermeasure to the above-mentioned problem, an invention is proposed; wherein image quality settings are set as desired after RAW image data is stored in a memory by an image sensing operation; the RAW image data in the memory is read out; and then image processing based on the image quality settings is performed on the read RAW image data and a processed image is displayed on a display unit for confirmation (see Japanese Patent Laid-Open No. 2001-251551, for example). If the displayed image is not a desired one, the image quality settings are set again, and signal processing such as image processing based on the image quality settings is performed on the RAW image data and the processed image is displayed on the display unit for confirmation. If a desired image is obtained, the image data of the processed image is recorded onto a recording medium.

However, in an electronic camera in which an image associated with image data obtained by performing signal processing such as image processing based on image quality settings is displayed and confirmed, and then the signal-processed image data is recorded onto a recording medium, the image quality settings must be set for each image sensing operation. Furthermore, if a desired image is not obtained, the image quality setting, the signal processing and the image confirmation must be repeated. This requires a long time from image sensing to recording of image data, and therefore a long time before the camera becomes ready for the next image sensing operation, thereby causing missing of an image sensing opportunity.

SUMMARY OF THE INVENTION

The present invention has been made in consideration of the above situation, and has as its object to speedily prepare for the next image sensing operation after sensing an image with an easy operation while enabling acquisition of a desired image and to efficiently use a recording medium.

According to the present invention, the foregoing object is attained by providing an image sensing apparatus characterized by comprising: an image sensor that performs image sensing in response to an inputted image sensing instruction; a recording medium that stores a sensed image; and a controller that controls to record on the recording medium the sensed image in a first format instead of a second format, different from the first format, which is designated in advance when a format change instruction is designated by a user within a predetermined period after sensing the image.

According to another aspect of the present invention, the foregoing object is also attained by providing an image recording method characterized by comprising: performing image sensing in response to an inputted image sensing instruction; and recording on a recording medium a sensed image in a first format instead of a second format, different from the first format, which is designated in advance when a format change instruction is designated by a user within a predetermined period after sensing the image.

According to still another aspect of the present invention, the foregoing object is also attained by providing an image sensing apparatus characterized by comprising: an image sensor that performs image sensing in response to an inputted image sensing instruction; a recording medium that stores a sensed image; and a controller that controls to record on the recording medium the sensed image in a first format in addition to the sensed image in a second format, different from the first format, which is designated in advance when a format change instruction is designated by a user within a predetermined period after sensing the image.

According to still another aspect of the present invention, the foregoing object is also attained by providing an image recording method characterized by comprising: performing image sensing in response to an inputted image sensing instruction; and recording on the recording medium the sensed image in a first format in addition to the sensed image in a second format, different from the first format, which is designated in advance when a format change instruction is designated by a user within a predetermined period after sensing the image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
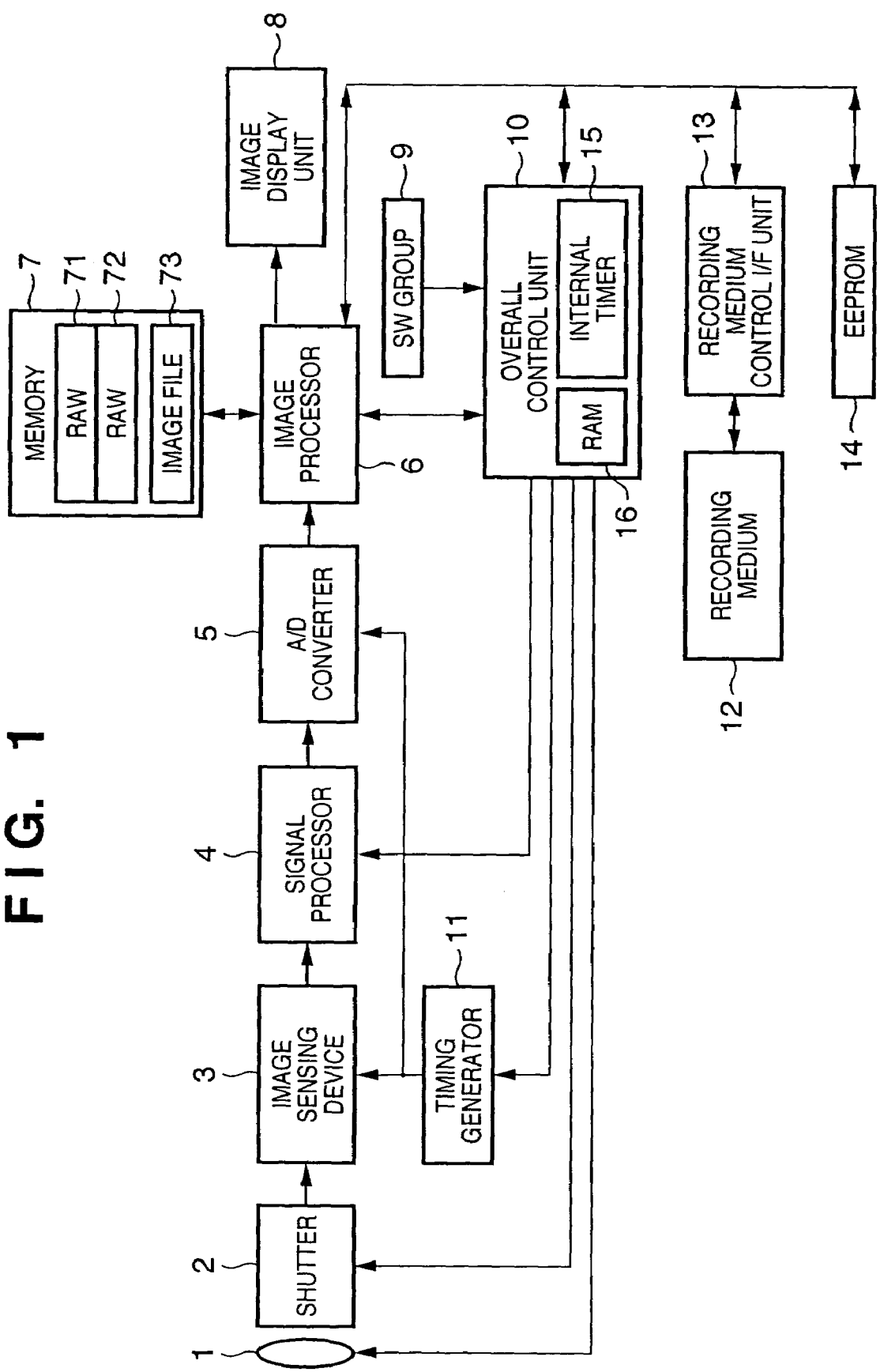
FIG. 1 is a block diagram showing a configuration example of an electronic camera to which an image sensing apparatus according to a first embodiment of the present invention is applied.

FIG. 1 is a block diagram showing a configuration example of an electronic camera to which an image sensing apparatus according to a first embodiment of the present invention is applied. The electronic camera shown in FIG. 1 has a recording function of converting an object image into electrical signals and recording it in a recording medium as image data and a playback function of reading image data from the recording medium and displaying an image associated with the image data on a display unit.

In FIG. 1, reference numeral 1 denotes a lens, 2 denotes a shutter, 3 denotes an image sensing device, and 4 denotes a signal processor for performing various corrections and clamping for image signals outputted from the image sensing device 3.

Reference numeral 5 denotes an A/D (analog/digital) converter for performing analog-to-digital conversion, which converts analog image signals outputted from the signal processor 4 into digital image data. Reference numeral 6 denotes an image processor for performing various signal processings such as image processing for digital image data inputted via the A/D converter 5 or for performing compression/expansion of the digital image data.

Reference numeral 7 denotes a memory provided inside the electronic camera for storing digital image data and various data. The memory 7 has at least two RAW data areas 71, 72 for storing image data outputted from the image sensing device 3 and digitalized by the A/D converter 5, which still holds color filter information for each pixel that has not been processed, that is, unprocessed image data to which various signal processings such as image processing has not been applied by the image processor 6 (the unprocessed data is hereinafter referred to as "RAW image data"). Each of the RAW data areas 71, 72 can store RAW image data of one image.

Furthermore, the memory 7 has also an image file area 73 for temporarily storing image data obtained by performing various processings on RAW image data, immediately before recording to a recording medium. The image file area 73 can store image data for multiple image sensing operation (multiple images).

Reference numeral 8 denotes an image display unit such as a liquid crystal display unit equipped for or fixed to the body of an electronic camera. The image display unit 8 is configured to include an image displaying circuit and displays an image associated with digital image data supplied from the A/D converter 5 or the memory 7 via the image processor 6.

Reference numeral 11 denotes a timing generator for outputting various timing signals to the image sensing device 3 and the A/D converter 5. Reference numeral 10 denotes an overall control unit which comprises a CPU for controlling the entire apparatus according to a program.

Reference numeral 14 denotes an EEPROM for storing an operation program for the overall control unit 10. Reference numeral 12 denotes a detachable recording medium for recording or reading out of image data, and 13 denotes a recording medium control interface unit (hereinafter referred to as "recording medium control I/F unit") for exchanging data with the recording medium 12.

Reference numeral 15 denotes an internal timer incorporated in the overall control unit 10, and 16 denotes a RAM incorporated in the overall control unit 10. Reference numeral 9 denotes a group of switches (SW group) for instructing various operations and operation modes of the apparatus, the state of which is detected and controlled by the overall control unit 10. In the first embodiment, the form of the SW group 9 (push button, dial, and the like) is not limited here.

The SW group 9 is configured to instruct at least a power-off mode, a recording mode, and a playback mode as the operation mode of the electronic camera according to the first embodiment. The SW group 9 is provided with an image sensing instruction unit and a recording instruction unit as well as at least a recording medium cover detection unit and a battery cover detection unit for detecting opening and closing of the cover of the recording medium 12 and the cover of a battery (not shown), respectively.

[Electronic Viewfinder Operation]

The operation of an electronic camera having the above-mentioned configuration to be performed in an electronic viewfinder mode for confirming a target object is now described below. When an instruction to operate in the electronic viewfinder mode is inputted into the overall control unit 10 by the SW group 9, the overall control unit 10 opens the shutter 2. Exposure is properly controlled by the electronic shutter for controlling exposure time based on a timing signal outputted from the timing generator 11, then the image sensing device 3 is read out.

Various processings such as gain compensation and clamping are performed for the analog image signals at the signal processor 4. After that, analog/digital conversion is performed by the A/D converter 5, and the size of the image is changed (hereinafter also referred to as "resized") to a size suitable for various signal processings such as image processing and/or for display on the image display unit 8 at the image processor 6. The image is then temporarily stored in the memory 7. The image data stored in the memory 7 is read out again and displayed on the image display unit 8.

The above-mentioned processing operations such as reading out from the image sensing device 3 are repeated to implement the electronic viewfinder function (hereinafter also referred to "EVF") of the electronic camera.

[Image Sensing Operation]

Figure 2:
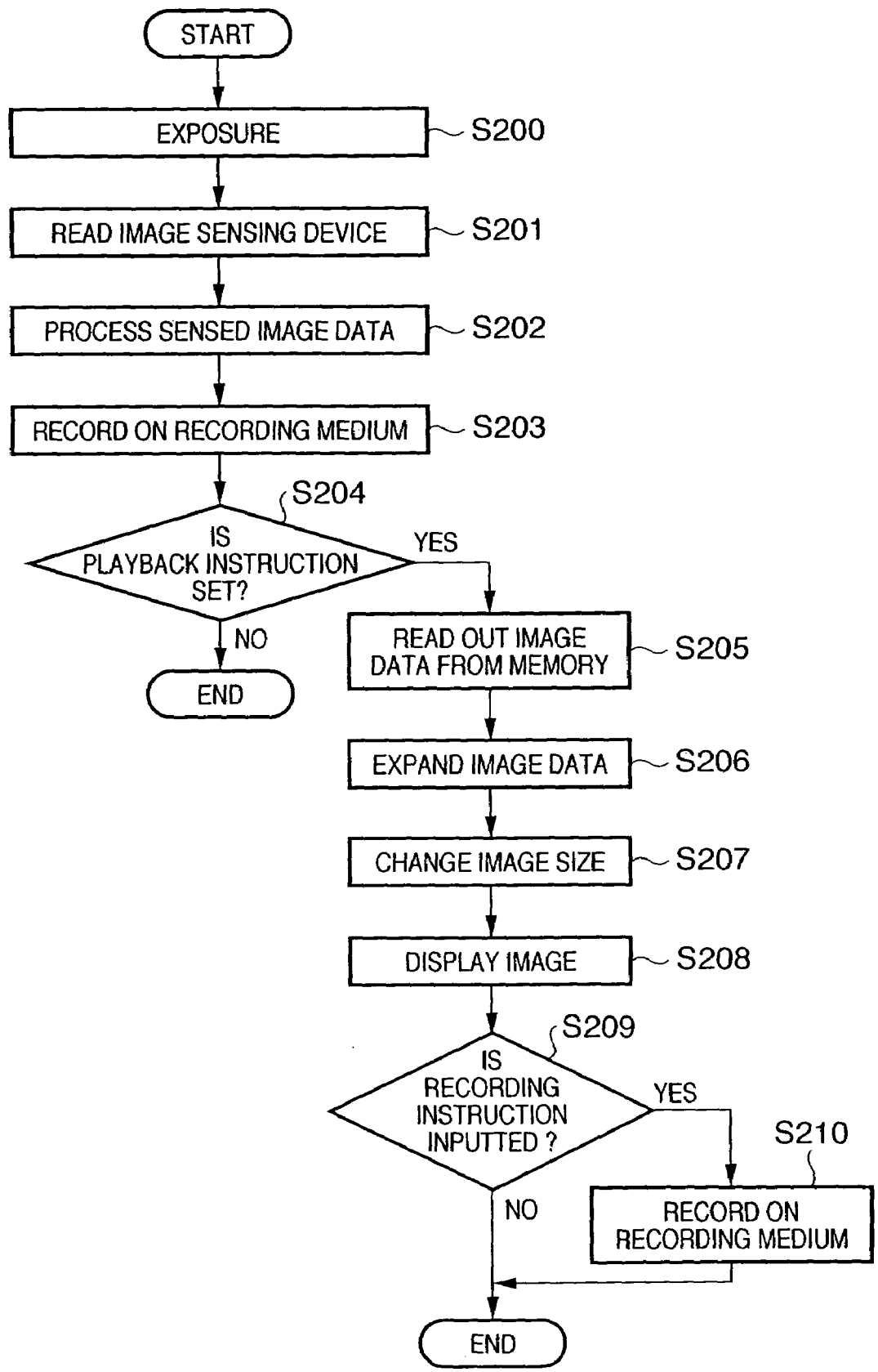
FIG. 2 is a flowchart illustrating an image sensing operation of the electronic camera according to the first embodiment of the present invention.

An image sensing operation of the electronic camera having the above-mentioned configuration is now described with reference to the flowchart shown in FIG. 2.

When an image sensing/recording command (image sensing instruction) is inputted into the overall control unit 10 by the SW group 9, the overall control unit 10 performs an image sensing operation.

The overall control unit 10 first drives the shutter 2 to expose the image sensing device 3 (step S200), and after a proper duration of exposure, starts reading of charge signals from the image sensing device 3 (step S201). Various processings such as gain correction for each color and clamping are performed for the analog image signals at the signal processor 4. The signals are then analog/digital converted by the A/D converter 5 and stored in either of the RAW data areas 71, 72 of the memory 7 via the image processor 6.

In this case, the image processor 6 does not perform signal processing such as image processing for digital image data inputted from the A/D converter 5 but simply stores it in either of the RAW data areas 71, 72 of the memory 7. Accordingly, the image data (RAW image data) of the image obtained from the image sensing device 3 is stored as it is in either of the RAW data area 71, 72 of the memory 7.

Next, the sensed image data is processed (step S202).

It is assumed that, in an electronic camera according to the first embodiment, a recording mode can be arbitrarily selected from JPEG format in which image data undergoes lossy compression conforming to JPEG method, one of image data compression/expansion method, is recorded, and RAW format in which RAW image data is recorded, as the recording format for automatically recording image data of a sensed image onto the recording medium 12.

—In the Case where the Recording Format of Image Data Onto a Recording Medium is JPEG Format The RAW image data stored in the memory 7 is read out, and signal processing such as image processing is performed for the RAW image data at the image processor 6 so that the RAW image data becomes YUV data. The YUV data is then compressed (in JPEG method) and stored in the image file area 73 of the memory 7. At the same time, the YUV data is resized to be smaller and compressed, and then it is stored in the image file area 73 of the memory 7 as image data for a thumbnail image.

Furthermore, data of various image sensing conditions of the image is additionally stored in the image file area 73 of the memory 7. In this way, an image file composed of JPEG-format image data, image data of a thumbnail image, and image sensing condition data and the like for a latest sensed image are completed in the image file area 73. It should be noted that the structure of the image file according to the first embodiment is not limited to this structure.

Furthermore, the image file data is again read out from the image file area 73 of the memory 7 and recorded onto the recording medium 12 via the image processor 6 and the recording medium control I/F unit 13 (step S203).

Then, the state (data storing state) of the RAW data areas 71, 72 of the memory 7 at this point of time is displayed on the image display unit 8.

Figure 4A:
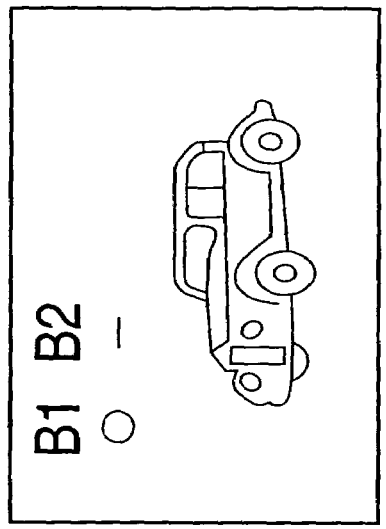
FIGS. 4A to 4C show an example of a display screen on an image display unit of the electronic camera according to the first embodiment of the present invention.

This is now described with reference to FIG. 4A. In FIG. 4A, the RAW data areas 71, 72 of the memory 7 are indicated as internal buffers B1, B2 for convenience of explanation, and it is indicated by the symbol "" that RAW image data of the latest image exists in the internal buffer B1. In this case, only one image has been sensed, and therefore "−" is shown to indicate that there is no RAW image data recordable onto the recording medium 12 in the internal buffer B2.

—In the Case where the Recording Format of Image Data Onto a Recording Medium is RAW Format The RAW image data stored in the memory 7 is read out, undergoes lossless compression within the image processor 6, and stored in the image file area 73 of the memory 7. The RAW image data is again read out and signal-processed within the image processor 6. The YUV data obtained by the signal processing is resized to be smaller and compressed to be stored in the image file area 73 of the memory 7 as image data of a thumbnail image.

Furthermore, data of various image sensing conditions of the image is additionally stored in the image file area 73 of the memory 7. In this way, an image file composed of RAW image data, image data of a thumbnail image, and image sensing condition data and the like for a latest sensed image is completed in the image file area 73. However, the structure of the image file according to the first embodiment is not limited to this structure. The RAW image data may not undergo lossless compression.

Furthermore, the image file data is again read out from the image file area 73 of the memory 7 and recorded onto the recording medium 12 via the image processor 6 and the recording medium control I/F unit 13 (step S203). In this case, the image data to be recorded onto the recording medium 12 may be image data obtained by applying lossless compression to the RAW image data or unprocessed image data which has not been undergone lossless compression.

Then, the state of the RAW data areas 71, 72 of the memory 7 at this point of time is displayed on the image display unit 8.

In this case, the recording format of the latest sensed image data is RAW format, and therefore the RAW image data of the image is already recorded in the recording medium 12. Accordingly, the symbol "−" is shown to indicate that there is no RAW image data recordable onto the recording medium 12 in the internal buffer B1. This can prevent the same RAW image data from being redundantly recorded onto the recording medium 12. Only one image has been sensed, and therefore "−" is shown to indicate that there is no RAW image data recordable onto the recording medium 12 in the internal buffer B2.

In this way, the image sensing operation for the first image ends.

Image sensing operation of the second and subsequent images is performed similarly to the operation described above, using either of the RAW data areas 71, 72 of the memory 7 different from that used for the previous image sensing operation. In other words, the RAW data areas 71, 72 are alternately used for each image sensing operation.

Accordingly, when the predetermined number of images have been sensed, RAW image data of the latest sensed image and RAW image data of the second latest image are stored in the RAW data areas 71, 72, respectively.

Figure 4B:
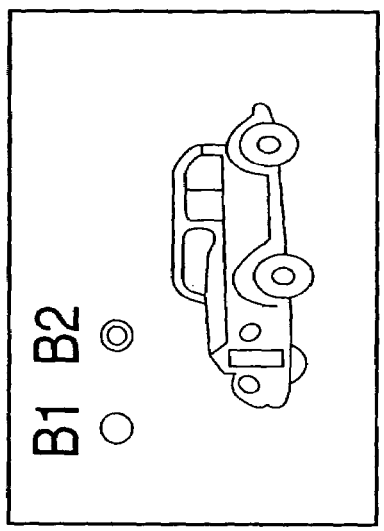

FIG. 4B shows an example of a display screen of the image display unit 8 to be displayed when two images are sensed in the case where the recording format of sensed image data is JPEG format.

In FIG. 4B, since the second image has been sensed, it is indicated by "" that RAW image data of the latest image exists in the internal buffer B2, and it is indicated by "○" that RAW image data of the previously sensed image exists in the internal buffer B1.

In this case, if a switch for inputting an image sensing/recording command among the SW group 9 into the overall control unit 10 is still pushed down after sensing an image, or the apparatus is set in advance to display a sensed image on the image display unit 8 to check it before storing it, or such display operation is designated (YES in step S204), then the overall control unit 10 performs simple playback of the latest image. The simple playback operation is described below.

The image data of the latest image stored in the image file area 73 of the memory 7 is again read out (step S205), and the compressed image data is expanded at the image processor 6 (step S206). The size of the image data is then changed to a size suitable for display on the image display unit 8, and the image data is again stored in the memory 7 (step S207).

The image data stored in the memory 7 is again read out, and the image is displayed on the image display unit 8 (step S208).

The simple playback operation may be performed in other ways such as shown below.

The RAW image data stored in either of the RAW data areas 71, 72 of the memory 7 is read out and signal-processed at the image processor 6 so that the RAW image data becomes YUV data. The size of the YUV data is then changed to be a size suitable for display on the image display unit 8, and the data is again stored in the memory 7. The image data stored in the memory 7 is again read out, and the image is displayed on the image display unit 8.

When the image displayed on the image display unit 8 is confirmed and an instruction to record the RAW image data is inputted into the overall control unit 10 by the SW group 9 (step S209), the RAW image data of the latest image stored in either of the RAW data areas 71, 72 of the memory 7 is read out by the overall control unit 10, applied with lossless compression at the image processor 6, and then recorded onto the recording medium 12 via the recording medium control I/F unit 13 (step S210).

It is also possible to read out the unprocessed RAW image data from the memory 7 and record it onto the recording medium 12 via the recording medium control I/F unit 13 without applying lossless compression at the image processor 6.

The details of the operation of recording the RAW image data onto the recording medium 12 are the same as those of the recording operation in the image sensing operation.

The overall control unit 10 also displays on the image display unit 8 information by which a user can confirm that the RAW image data has been recorded onto the recording medium 12. For example, information by which the user can confirm the state is displayed on the image display unit 8, such as "Start recording" when recording of RAW image data is instructed, "Recording" when writing (recording) of the RAW image data is started, and "Recorded" when writing of the RAW image data ends.

Simultaneously with recording of the RAW image data onto the recording medium 12, the overall control unit 10 inhibits re-recording of the RAW image data of the latest image existing in the internal buffer B2 (RAW data area 72) onto the recording medium 12 for management.

Figure 4C:
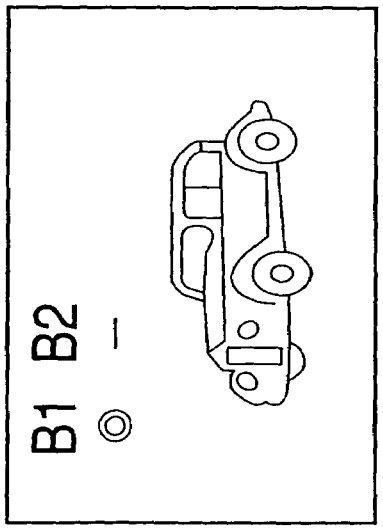

FIG. 4C shows an example of a display screen of the image display unit 8 to be displayed after RAW image data is recorded onto the recording medium 12 in a manner described above.

As shown in 4C, it is indicated by "−" that, since the RAW image data existing in the internal buffer B2 has been recorded onto the recording medium 12, re-recording of the RAW image data of the latest image in the internal buffer B2 onto the recording medium 12 is inhibited. Furthermore, it is indicated by "○" that the previously sensed RAW image data exists in the internal buffer B1.

Thus, when an instruction to record RAW image data is inputted again into the overall control unit 10 by the SW group 9, the overall control unit 10 determines that the operation of recording RAW image data of the latest image existing in the internal buffer B2 onto the recording medium 12 is disabled (inhibited). The overall control unit 10 then displays on the image display unit 8 information notifying that the recording instruction has been rejected, such as "Recording disabled".

The same applies to the case where an instruction to record RAW image data is inputted when no image has been sensed or when all the RAW image data in the RAW data areas 71, 72 of the memory 7 have been recorded onto the recording medium 12.

When an instruction to playback the previously sensed image is inputted into the overall control unit 10 by the SW group 9, the overall control unit 10 similarly performs simple playback of the previously sensed image. When, after confirmation of the sensed image, an instruction to record RAW image data is inputted into the overall control unit 10 by the SW group 9, the overall control unit 10 again reads out the RAW image data of the previously sensed image stored in either of the RAW data areas 71, 72 of the memory 7 and records it onto the recording medium 12 via the image processor 6 and the recording medium control I/F unit 13.

The operation performed here is similar to the above-mentioned operation performed when RAW image data of the latest image is recorded onto the recording medium 12.

It is naturally displayed on the display screen of the image display unit 8 that re-recording of the RAW image data of the previously sensed image existing in the internal buffer B1 onto the recording medium 12 is inhibited, which is indicated by "–".

If an instruction to record RAW image data is inputted when the recording format of a sensed image data to be recorded onto the recording medium 12 is RAW format, the overall control unit 10 displays on the image display unit 8 information notifying that the recording instruction has been rejected, such as "Recording disabled" without recording the RAW image data onto the recording medium 12.

In this case, on the display screen of the image display unit 8, it is indicated by "–" that recording of the RAW data, which exists in the internal buffer B2 at the stage of completion of image sensing operation, onto the recording medium 12 is inhibited.

Though, in the above explanation, an instruction to record RAW image data to the recording medium 12 is inputted after a sensed image is displayed on the image display unit 8 and confirmed, it is also possible to provide a dedicated SW in the SW group 9, such as a SW for instructing recording of RAW image data of the latest image and a SW for instructing recording of RAW image data of the previously (second latest) sensed image, to enable recording of RAW image data onto the recording medium 12 without confirmation of the target image during operation of EVF, for example.

Furthermore, information by which the user can confirm the state may be displayed on the image display unit 8, such as "Start recording" when an instruction to record RAW image data is inputted, "Recording" when writing of the RAW image data is started, and "Recorded" when writing of the RAW image data ends. Furthermore, information notifying that the recording instruction has been rejected, such as "Recording disabled", may be displayed on the image display unit 8 when the recording format of sensed image data is RAW format or when RAW image data is already recorded on the recording medium 12.

In any of the cases described above, the overall control unit 10 operates to reject an instruction to record RAW image data from the SW group 9 at least during an image sensing operation from start of exposure till completion of reading out from the image sensing device 3. In this case, information notifying the recording instruction has been rejected may be displayed on the image display unit 8.

[Playback Operation]

Figure 3:
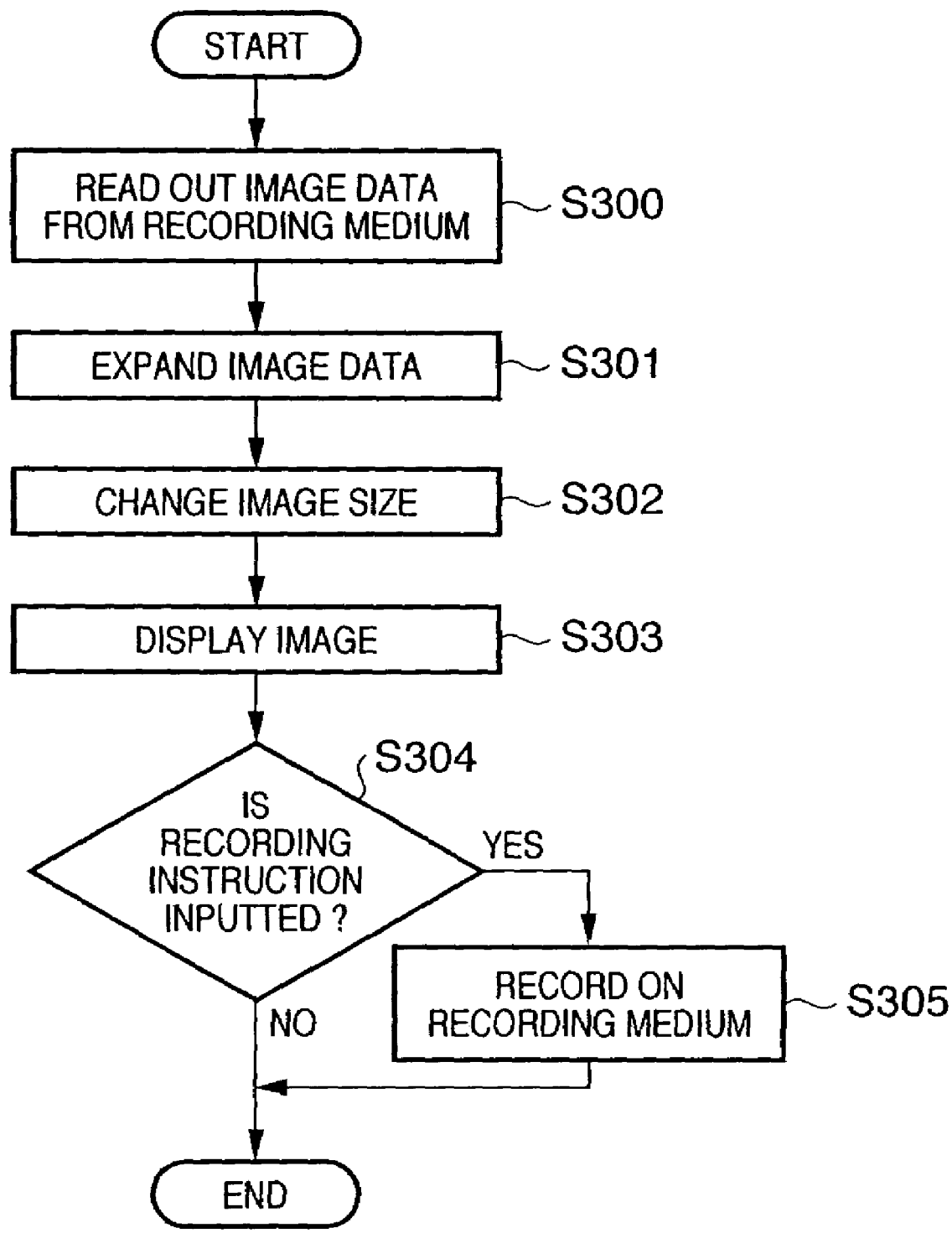
FIG. 3 is a flowchart illustrating a playback operation of the electronic camera according to the first embodiment of the present invention.

The playback operation of image data recorded in the recording medium 12 of an electronic camera having the above-mentioned configuration is now described according to the flowchart shown in FIG. 3.

The overall control unit 10 performs a playback operation when a playback command for a recorded image is inputted into the overall control unit 10 by the SW group 9.

In other words, image data recorded on the recording medium 12 is read out via the recording medium control I/F unit 13 and temporarily stored in the memory 7 (step S300).

The image data stored in the memory 7 is read out, and the image data which has been compressed is expanded at the image processor 6 (step S301). Furthermore, after the size of the image data is changed to a size suitable for display on the image display unit 8, the image data is again stored in the memory 7 (step S302). The image data stored in the memory 7 is again read out, and the image is displayed on the image display unit 8 (step S303).

When a frame forwarding instruction is inputted into the overall control unit 10 by the SW group 9, an image recorded next to the image currently playbacked (the image displayed on the image display unit 8) is playbacked in a similar manner. When a frame backwarding instruction is inputted into the overall control unit 10 by the SW group 9, the image recorded before the image currently playbacked is playbacked in a similar manner.

Suppose that the latest or the previously (second latest) sensed image is displayed by a frame forwarding/backwarding operation according to an instruction, and that RAW image data of the displayed image has not been recorded. In this case, information enabling a user to confirm the state is displayed on the image display unit 8 in a manner so that it is overlapped with the playbacked image, such as "Possible to record RAW data", indicating that RAW image data stored in either of RAW data areas 71, 72 of the memory 7 can be recorded onto the recording medium 12.

In this case, when an instruction to record RAW image data is inputted into the overall control unit 10 by the SW group 9 (step S304), the overall control unit 10 displays a playback image on the image display unit 8 without displaying (by clearing) the information indicating that RAW image data can be recorded. The RAW image data of the playback image stored in the memory 7 is again read out and undergoes lossless compression at the image processor 6. Then the ROW image data is then recorded onto the recording medium 12 via the recording medium control I/F unit 13 (step S305).

The RAW image data may be read out from the memory 7 and recorded onto the recording medium 12 via the recording medium control I/F unit 13 without undergoing lossless compression at the image processor 6.

The details of the operation of recording the RAW image data onto the recording medium 12 are the same as those of the recording operation in the image sensing operation.

Though, in the above explanation, RAW image data is recorded onto the recording medium 12 after the latest or the previously (second latest) sensed image is playbacked and confirmed, it is also possible to provide a dedicated SW for the SW group 9, such as a SW for instructing recording of RAW image data of the latest image and a SW for instructing recording of RAW image data of the previously (second latest) sensed image, to enable recording of RAW image data without confirmation of the target image when another image is displayed.

In this case, information enabling a user to confirm the state may be displayed on the image display unit 8, such as "Start recording" when an instruction to record RAW image data is inputted, "Recording" when writing of the RAW image data is started, and "Recorded" when writing of the RAW image data ends. Furthermore, when the recording format of image data is RAW format or when RAW image data is already recorded in the recording medium 12, information notifying that the recording instruction has been rejected may be displayed on the image display unit 8, such as "Recording disabled".

[Other Operations]

When a battery (not shown) is used as a power source for the electronic camera according to the first embodiment, if the voltage level of the battery is detected to be below a predetermined value, power supply to the entire apparatus is controlled to be cut after RAW image data stored in the RAW data areas 71, 72 is automatically recorded onto the recording medium 12.

The power supply to the entire apparatus is also controlled to be cut after RAW image data stored in the RAW data areas 71, 72 is automatically recorded in the recording medium 12 in case of any error caused during operation of the electronic camera according to the first embodiment.

Furthermore, the power supply to the entire apparatus may be also controlled to be cut after RAW image data stored in the RAW data areas 71, 72 is automatically recorded in the recording medium 12, if it is detected that the cover (not shown) of the recording medium 12 or the battery is opened.

In this way, by automatically recording RAW image data stored in the RAW data areas 71, 72 onto the recording medium 12 before cutting power supply in case of detection of a voltage level drop or an error caused in an operation in the electronic camera, it is possible to prevent loss of RAW image data and to surely record the RAW image data onto the recording medium 12.

Conventionally, when image sensing is performed and data is recorded onto a recording medium in JPEG format, although it may be possible to obtain an image sensed under desired image sensing conditions for exposure, focus, composition and the like, but it may not be possible to obtain the same image without deterioration of the quality of the sensed image after performing desired signal processings for, e.g., image size, compressing rate, color effect, aperture, contrast, color density, and white balancing, when the desired processings have not been performed on the image.

Further, in an electronic camera provided with image sensing modes capable of sensing a black-and-white image, a sepia image and the like, it is impossible to obtain a normal color image of the image sensed in the selected image sensing mode. Furthermore, it is also impossible to obtain an image compressed at a lower compression rate than the image compressed in JPEG format, from the image.

By contrast, according to the first embodiment, all the above problems of the conventional electronic camera are solved. Furthermore, if a sensed image, the image data of which is recorded in JPEG format in the recording medium 12, is not a desired one when it is confirmed after image sensing operation, the RAW image data of the sensed image can be easily recorded onto the recording medium 12. Thus, it is possible to proceed to image sensing of the next image immediately, thereby preventing missing of an image sensing opportunity. Furthermore, it is possible to perform signal processing later on, e.g., a personal computer and therefore surely obtain a desired image.

Furthermore, according to the first embodiment, image data of a sensed image is not always recorded in the recording medium 12 in both of JPEG format and RAW format. RAW image data is additionally recorded onto the recording medium 12 only when the RAW image data is not recorded in the recording medium 12 (that is, when the format for recording to the recording medium 12 is not RAW format) and a recording instruction has been inputted, so that an increase in data amount of one image recorded onto the recording medium 12 can be prevented.

Though a message such as "Recording disabled" is displayed on the image display unit 8 to notify the user that an instruction to record RAW image data has been rejected in the above description, a buzzer may be sounded as an alarm.

Though each of various instruction means has been explained as a switch of the SW group 9, it is not limited thereto. Various instruction means may be implemented by displaying on the image display unit 8 a menu display including items, each of which corresponds to each instruction so that a particular item can be selected from the menu display via a SW operation.

Though the RAW data areas 71, 72 of the memory 7 have been expressed as internal buffers B1, B2 for the sake of convenience, and the state of each internal buffer have been indicated by "", "○", and "–", they are not limited thereto. Any indication manner may be possible only if the internal buffer B1, B2 and the state thereof can be identified and the user can confirm the state of the buffers with the indication.

Though, according to the first embodiment, JPEG format, in which image data compressed in accordance with JPEG method is recorded, is used as the recording format different from RAW format for recording a sensed image data onto the recording medium 12, the recording format is not limited to the JPEG format.

Further, according to the first embodiment, the image sensing operation and playback operation have been explained in the case where the memory 7 has RAW data areas 71, 72 for storing RAW image data for two images in total, the operations are not limited thereto. Even when there is provided RAW data area for one image or for more than two images, the same effect of the first embodiment described above can be obtained in a similar manner to that of the first embodiment.

Furthermore, a recording instruction is accepted during an image is displayed in the first embodiment, however, the present invention is not limited to this, and a recording instruction may be accepted until, e.g., the next image sensing operation starts or the power supply of the electronic camera is turned off.

As described above, according to the first embodiment of the present invention, image data acquired by applying lossy compression to an image obtained by sensing in response to an image sensing instruction is recorded onto a recording medium, and unprocessed image data of the sensed image is internally held, so that the unprocessed image data corresponding to the compressed image data recorded on the recording medium is recorded onto the recording medium in response to an instruction to record the unprocessed image data.

Thus, if the image associated with the compressed image data recorded on the recording medium is not a desired one when it is confirmed after sensing, the unprocessed image data of the sensed image can be immediately recorded onto the recording medium in response to the recording instruction. Accordingly, it is possible to quickly proceed to sensing of the next image, thereby preventing missing of an image sensing opportunity. Furthermore, it is possible to surely obtain a desired image by performing signal processing later on a personal computer, for example.

Second Embodiment

Figure 5:
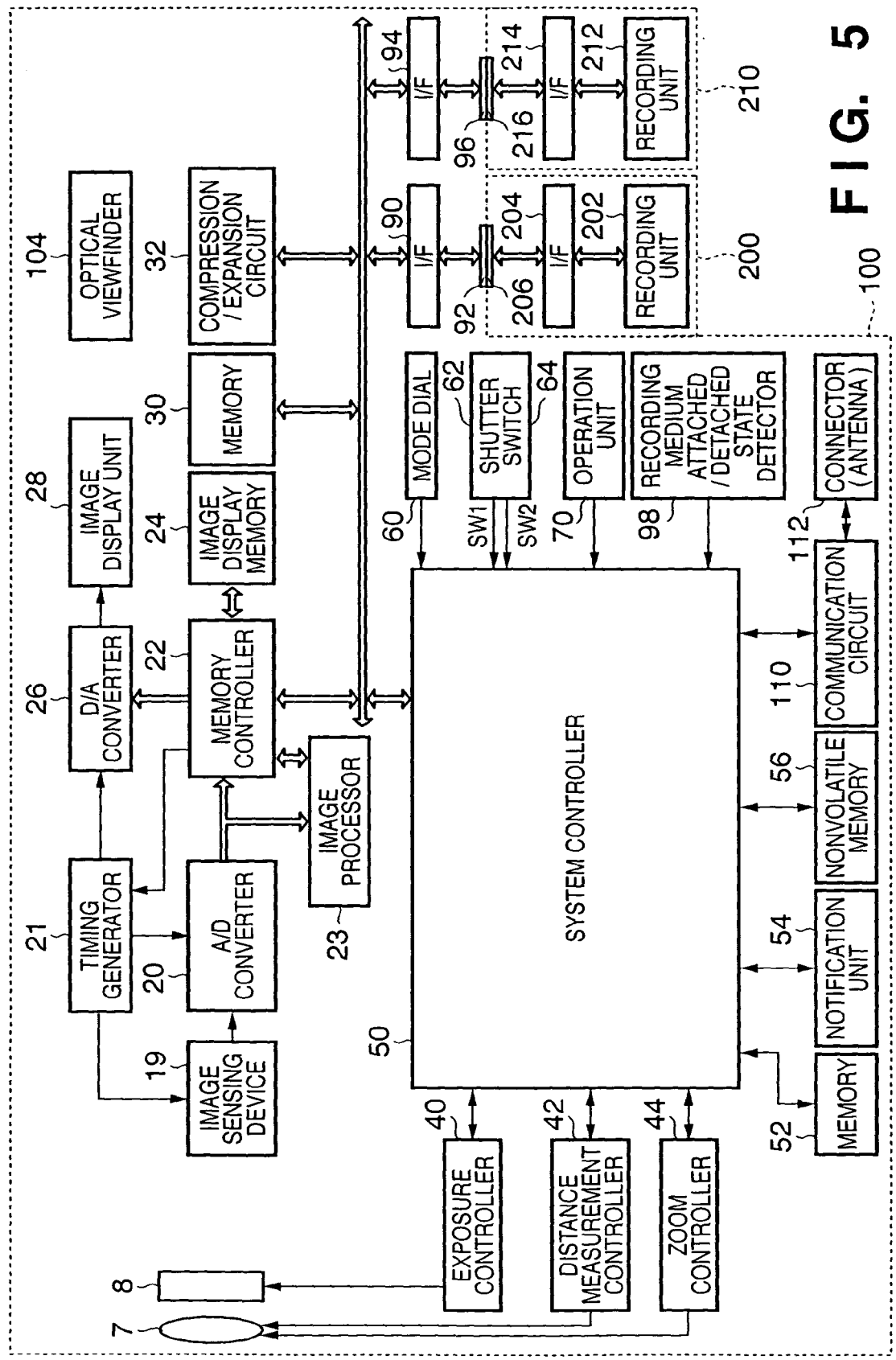
FIG. 5 is a block diagram showing a configuration of an image sensing apparatus according to a second embodiment of the present invention.

FIG. 5 is a block diagram showing a configuration of an image sensing apparatus according to a second embodiment of the present invention. In FIG. 5, reference numeral 100 denotes an image sensing apparatus, particularly a digital still camera, having a function of recording a sensed image onto a recording medium.

In the image sensing apparatus 100, reference numeral 17 denotes an image sensing lens; 19, a shutter having a diaphragm function; 19, an image sensing device, such as CCD (charge coupled device) or CMOS sensor, which converts an optical image into an electric signal; 20, an A/D converter which converts an analog signal output from the image sensing device 19 into a digital signal; 21, a timing generator which supplies a clock signal and a control signal respectively to the image sensing device 19, the A/D converter 20 and a D/A converter 26. The timing generator is controlled by a memory controller 22 and a system controller 50 which will be described later.

Numeral 23 denotes an image processor which performs predetermined pixel interpolation processing, color conversion processing and the like on image data from the A/D converter 20 (the image data is referred to as "RAW image data" hereinafter) or image data from the memory controller 22. The image processor 23 performs predetermined calculation processing using the sensed image data, and the system controller 50 performs through-the-lens (TTL) auto focus (AF) processing, auto exposure (AE) processing with respect to a shutter controller 40 and a distance measurement controller 42, based on the result of calculations. Further, the image processor 23 performs predetermined calculation using the sensed image data, and performs TTL auto white balance (AWB) processing, based on the result of calculations.

The memory controller 22 controls the A/D converter 20, the timing generator 21, the image processor 23, an image display memory 24 (to be described later), the D/A converter 26, a memory 30 and a compression/expansion circuit 32. The RAW image data outputted from the A/D converter 20 under control of the memory controller 22 is written into the image display memory 24 or the memory 30 via the image processor 23 and the memory controller 22, or only via the memory controller 22.

Numeral 24 denotes the image display memory which receives image data to be displayed on an image display unit 28 (to be described later) from the memory controller 22; 26, a D/A converter which converts image data into analog image signals; and 28, the image display unit comprising an TFT (thin-film transistor) LCD or the like. Image data written into the image display memory 24 is displayed on the image display unit 28 via the D/A converter 26. An electronic finder function is realized by sequentially display obtained images on the image display unit 28. Further, image display unit 28 arbitrarily turns ON/OFF its display, in accordance with an instruction from the system controller 50. If the display is turned OFF, the electric consumption of the image processing apparatus 100 can be greatly reduced.

The memory 30, used for storing sensed still images and moving images, has a sufficient storage capacity for storing a predetermined number of still images and a moving image for a predetermined period. In sequential image sensing to sequentially obtain a plural number of still images or panoramic images sensing, a large amount of image data can be written into the memory 30 at a high speed. Further, the memory 30 may be used as a work area for the system controller 50.

The compression/expansion circuit 32 compresses or expands image data in JPEG method by adaptive discrete cosine transformation (ADCT) or the like. The compression/expansion circuit 32 reads image data stored in the memory 30 and performs JPEG-compression or expansion processing on the read image data, and writes the processed data into the memory 30 under control of the memory controller 22. Note that the compression/expansion method which the compression/expansion circuit 32 can adopt is not limited to JPEG method, and other image compression/expansion method may be used. Further, if the compression/expansion circuit 32 can operate in a plurality of compression/expansion methods, a desired compression/expansion method can be selected by a user.

The shutter controller 40 controls the shutter 12 having the diaphragm function. The distance measurement controller 42 controls focusing of the image sensing lens 10. Numeral 44 denotes a zoom controller which controls zooming of the image sensing lens 17. The system controller 50 (to be described later) controls the shutter controller 40 and the distance measurement controller 42 by the TTL method, in accordance with the result of calculations by the image processor 23 based on the sensed image data.

The system controller 50 controls the overall image sensing apparatus 100. Memory 52 stores the constants, variables, and programs for operation of the system controller 50. When the image sensing apparatus 100 holds in advance a recording instruction which indicates whether to record RAW image data on the memory 30 or not, it is the memory 52 that stores the information on the recording instruction. In short, the system controller 50 controls the image sensing apparatus 100 by executing a program read out from the memory 52. For instance, the system controller 50 controls recording processing of RAW image data onto memory 30 by controlling the memory controller 22 by referring to the information of the recording instruction in the memory 52. Furthermore, the system controller 50 has a function of acquiring recording capacity, showing the maximum recordable amount of information and remaining capacity indicating recordacle capacity of memory, of recording media 200, 210 (to be described later).

Numeral 54 denotes a notification unit which notifies operating statuses (number of sensed image, remaining power of battery, etc.), messages and the like to the outside by using characters, images, sound and the like, in correspondence with execution of program by the system controller 50. The notification unit 54 comprises one or more combinations of display devices including an LCD and an LED for visual notification and sound generating devices for audio notification. Especially, the display device or devices is/are provided in a single or plural visually-recognizable positions around an operation unit 70 of the image processing apparatus 100. Further, a part of functions of the notification unit 54 is provided within an optical finder 104.

The display contents of the notification unit 54, displayed on the LCD or the like, include an operation mode, indication of single shot/sequential image sensing, a self timer, a compression rate, the number of recording pixels, the number of recorded images, the number of recordable images, a shutter speed, an f number (aperture), exposure compensation, flash illumination, pink-eye effect mitigation, macro image sensing, a buzzer-set state, a timer battery level, a battery level, an error state, information of plural digit numbers, attached/detached status of the recording media 200 and 210, operation of communication I/F, date and time, and RAW format recording.

Further, the display contents of the notification unit 54, displayed within the optical finder 104, include an operation mode, a focus state, a camera shake warning, a flash charge state, the shutter speed, the f number (aperture), the exposure compensation, and RAW format recording. Numeral 56 denotes an electrically erasable and recordable nonvolatile memory such as an EEPROM. The nonvolatile memory 56 also stores a program necessary to start up the image sensing apparatus 100.

A mode dial 60, a shutter switch SW1 62, a shutter switch SW2 64 and an operation unit 70 are operation means for inputting various operation instructions to the system controller 50, comprising a single or plurality of combinations of switches, dials, touch panels, a device for pointing by line-of-sight detection, a voice recognition device, and the like.

Next, the operation means will be described in more detail.

The mode dial switch 60 can select various function modes such as a power OFF mode, an image sensing mode, a panoramic image sensing mode, a playback mode, and a multi-image reproduction/deletion mode. The shutter switch SW1 62 is turned ON by half stroke of a shutter button (not shown). The shutter switch SW2 64 is turned ON by full stroke of the shutter button (not shown), to instruct start of a series of operations of exposure processing to write an image signal read from the image sensing device 19 into the memory 30 as image data (RAW image data), via the A/D converter 20 and the memory controller 22, development processing of generating image data from the sensed image data (RAW image data) by using calculations by the image processor 23 and the memory controller 22, and recording processing to read the image data from the memory 30, compress the image data by the compression/expansion circuit 32, and write the compressed image data into the recording medium 200 or 210.

The operation unit 70 comprises various buttons and touch panels including a menu button, a set button, a macro/non-macro selection button, a forward (+) button, a backward (−) button, a playback button, an image sensing quality selection button, an exposure correction button, and image display ON/OFF button, and RAW format recording instruction button. It should be noted that the aforesaid types of the mode dial switch 60 and the operation unit 70 are merely examples, and can have arbitrary forms in accordance with the functions of the image sensing apparatus 100. Further, by pressing down the RAW format recording instruction button, a recording instruction is transferred to the system controller 50 of the image sensing apparatus 100.

Numerals 90 and 94 denote interfaces for recording media such as a memory card or a hard disk; and 92 and 96, connectors for connection with the recording media 200 and 210 (to be described later). A recording medium attached/detached state detector 98 detects whether recording medium 200 and/or 210 is attached to the connector 92 and/or connector 96. In the present embodiment, two systems of interfaces and connectors for connection with the recording media 200 and 210 are employed. However, the number of systems is not limited, and a single or plurality of interfaces and connectors may be provided. Further, interfaces and connectors pursuant to different standards may be combined.

In a case where interfaces and connectors in conformity with the predetermined standard are used as the interfaces 90 and 94 and the connectors 92 and 96, the image sensing apparatus 100 can have a function of transmitting/receiving image data and management information attached to the image data with respect to other peripheral devices such as a computer and a printer by connection with various communication cards. The optical finder 104 can be used for image sensing without the electronic finder function by the image display unit 28. In the optical finder 104, realized are some of the functions of the notification unit 54 including the indication of focus state, the camera shake warning, the flash charge state, the shutter speed, the f number (aperture), the exposure compensation, the RAW format recording and the like.

A communication unit 110 has a function of performing wired or wireless communication using any one of or a plurality of various communication standards of RS232C, USB, IEEE 1394, LAN and so on. Reference numeral 112 denotes a connector for wired communication or an antenna for wireless communication to connect the image sensing apparatus 100 to another device via the communication unit 110. The recording media 200 and 210 comprise nonvolatile recording medium, such as memory card and hard disk, detachable from the image sensing apparatus 100. The recording medium 200 has a recording unit 202 of a semiconductor memory, a magnetic disk or the like, the interface 204 for communication with the image sensing apparatus 100, and the connector 206 for connection with the image sensing apparatus 100. Similarly, the recording medium 210 has a recording unit 212 of a semiconductor memory, a magnetic disk or the like, the interface 214 for communication with the image sensing apparatus 100, and the connector 216 for connection with the image sensing apparatus 100.

Note that the processing of the system controller 50 in FIG. 5 may be realized by a dedicated hardware, or each process may be realized by reading and executing a program for realizing each process from the memory 52 incorporated in the image sensing apparatus 100.

Further, the memory 52 or the like comprises a recording medium/media readable and recordable by a computer, including nonvolatile memory such as a hard disk device, a magneto-optical disk, and flash memory, or a recording medium such as CD-ROM, volatile memory such as RAM, or combination thereof.

The operation of the image sensing apparatus 100 shown in FIG. 5 is now described below.

Figure 6:
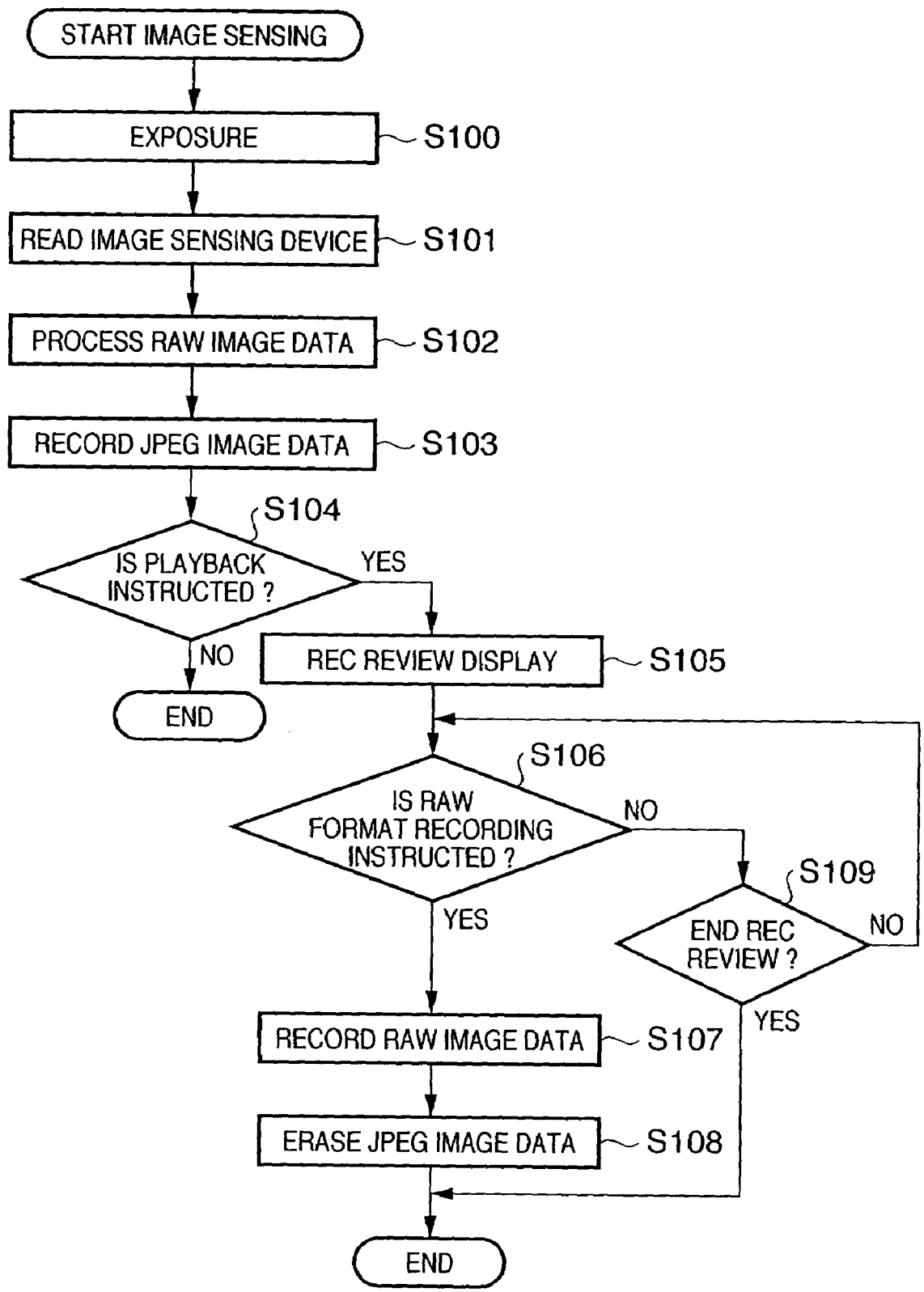
FIG. 6 is a flowchart illustrating an image sensing operation of the image sensing apparatus according to the second embodiment of the present invention.

FIG. 6 shows a flowchart of image sensing operation performed in the image sensing apparatus 100 shown in FIG. 5. Referring to FIG. 6, the operation of the image sensing apparatus 100 for RAW format recording is described.

First, in the image sensing apparatus 100, the system controller 50 drives the shutter 18 via the exposure controller 40 to control exposure in response to an instruction from the shutter switch SW2 64 (Step S100). Then, after a proper duration of exposure, the system controller 50 reads out RAW image data via the image sensing device 19, the A/D converter 20, the image processor 23, and the memory controller 22, or via the memory controller 22 directly from the A/D converter 20. The memory controller 22 then stores the RAW image data read out in a RAW data area of the memory 30 (step S101).

In this case, only minimum image processing is performed at the image processor 23, such as pixel squaring processing for interpolating the horizontal to vertical pixel ratio of the image sensing device 19 to 1:1, and the RAW image data which does not undergo lossy compression, that is, substantially in the state as it is read out from the image sensing device 19, is stored in the RAW data area of the memory 30.

Then, after completing step S101 described above, in the case where JPEG format, an lossy compression format, is designated as a recording format, the system controller 50 reads out the RAW image data written in the RAW data area of the memory 30, and uses the memory controller 22, and the image processor 23 when necessary, to perform various image processings to generate image data. Furthermore, the system controller 50 uses the compression/expansion circuit 32 to perform image compression processing for compressing and converting the image data into a designated JPEG format to generate compressed image data which has undergone lossy compression. As described above, the system controller 50 processes the RAW image data to generate compressed image data in JPEG format (hereinafter referred to as JPEG image data) (step S102).

Then, the system controller 50 executes JPEG data recording processing for writing the JPEG image data in a lossy compression format created at step S102 into the recording medium 200 or 210 via the interface 90 or 94, and the connector 92 or 96 (step S103). When it is preset that a sensed image is to be displayed (hereinafter referred to "rec review display") on the image display unit 28 for confirmation before storage or when rec review display is instructed by the operation unit 70 (in the case of "YES" at step S104), the system controller 50 displays (via rec review display) the generated compressed image data on an image display unit 28 via the image display memory 24 and the D/A converter 26 (step S105).

Figure 12:
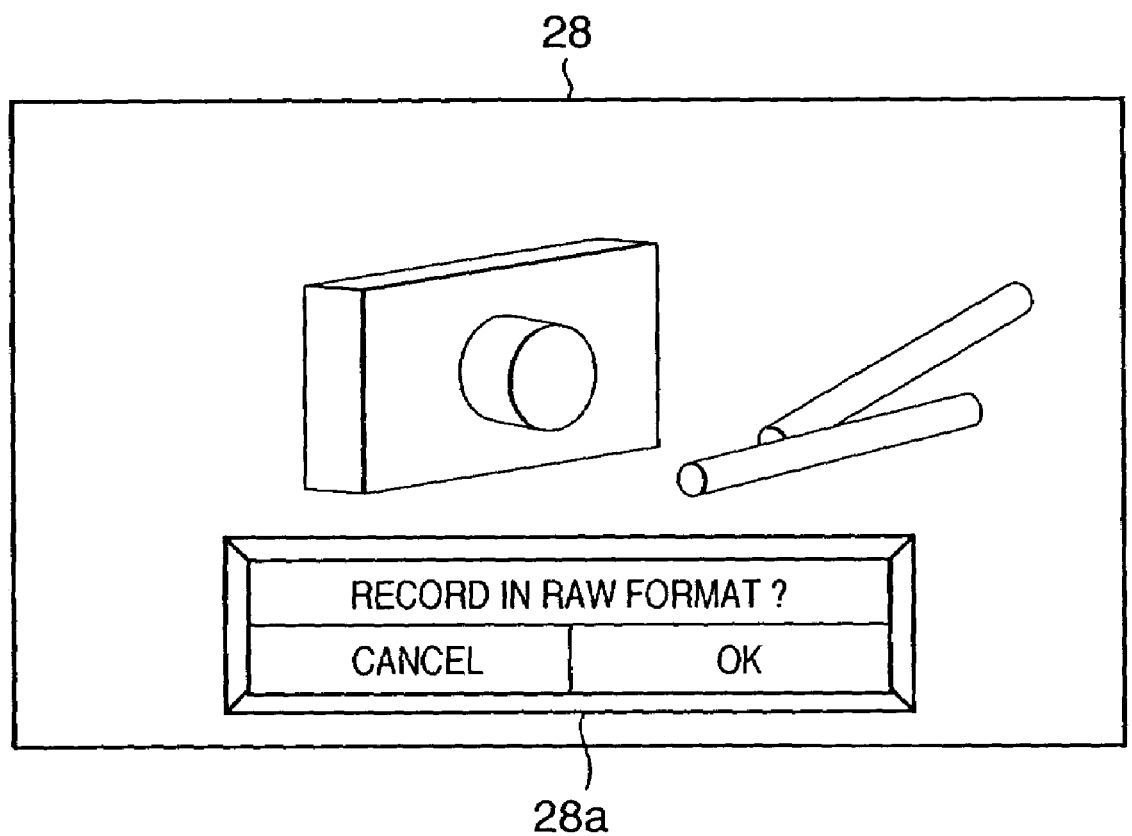
FIG. 12 shows an example of a recording format selection frame displayed on an image display unit 28 shown in FIG. 5.

In this case, if recording in RAW format is instructed by the operation unit 70 during rec review display, the system controller 50 displays on the image display unit 28 a recording format selection frame 28a, as shown in FIG. 12, including a message display frame for a confirmation message "Record in RAW format?" and a selection frame for selecting "Cancel" or "OK" in response to the message (step S106). The selection in the above-mentioned selection frame can be performed via the operation unit 70. If "Cancel" is selected or "OK" is not selected in the recording format selection frame 28a (in the case of "NO" at step S106), then the process proceeds to step S109.

Then, at step S109, if a predetermined time has elapsed without "OK" being selected in the recording format selection frame 28a and the rec review display is ended, or if the rec review display is ended via shutter switches 62, 64 or operation of the operation unit 70 (in the case of "YES" at step S109), then the image sensing operation ends without executing recording in RAW format. If the rec review display has not been ended (in the case of "NO" at step S109), then the process returns to step S106. That is, the recording format selection frame 28a continues to be displayed on the image display unit 28.

On the other hand, if "OK" is selected in the recording format selection frame 28a (in the case of "YES" at step S106), then the system controller 50 reads out the RAW image data written in the RAW data area of the memory 30 and records it onto the recording medium 200 or 210 via the interface 90 or 94, or via the connector 92 or 96 (step S107).

Then, the system controller 50 erases the JPEG image data recorded onto the recording medium 200 or 210 at step S103 (step S108), and then ends the image sensing operation. In this way, a sequence of image sensing operations in the image sensing apparatus 100 is completed.

As described above, at steps S107, S108, the image data can be surely recorded onto the recording medium 200 or 210 by erasing the JPEG image data from the recording medium 200 or 210 after recording the RAW image data onto the recording medium 200 or 210. In a processing method of recording RAW image data to a recording medium after erasing JPEG image data from the recording medium, for example, sensed image data will be lost without being recorded onto the recording medium in case of any unforeseen accident, such as interruption of a power source for the image sensing apparatus, caused before completion of the recording processing. This can be prevented by using the above-mentioned recording processing because at least one of JPEG image data or RAW image data is left in the recording medium in the recording processing.

In this way, according to the present invention, it is possible for a user to utilize the recording medium efficiently while recording a sensed image in RAW format at his discretion during image sensing, by erasing JPEG image data from the recording medium 200 or 210 after recording the RAW image data to the recording medium 200 or 210.

Though image data has been assumed to be written into the recording medium 200 or 210 in the above description, the same process is applied to image data which is not directly written into the recording medium 200 or 210 but is temporarily written into an image buffer through utilization of a delay-writing process and the like.

Though it was described that whether or not to perform RAW format recording should be selected during rec review display at step S106, it is also possible to instruct recording in RAW format at any time only if it is before starting the next image sensing operation after image sensing operation, irrespective of whether or not the rec review is displayed. Furthermore, though it was described that JPEG image data corresponding to RAW image data is erased every time a RAW format recording process is executed at step S108, it is also possible to later erase JPEG image data, which corresponds to RAW image data recorded in RAW format, collectively from the recording medium 200, 210 automatically or via a processing starting instruction by some instruction means, or to erase JPEG image data corresponding to RAW image data recorded in RAW format when a RAW format recording process for the next and succeeding image sensing operation is executed, for example.

An example of a different second RAW format recording process is now described, which can be performed instead of processing performed at steps S107, S108 shown in FIG. 6 (hereinafter referred to as a "RAW format recording process").

Figure 7:
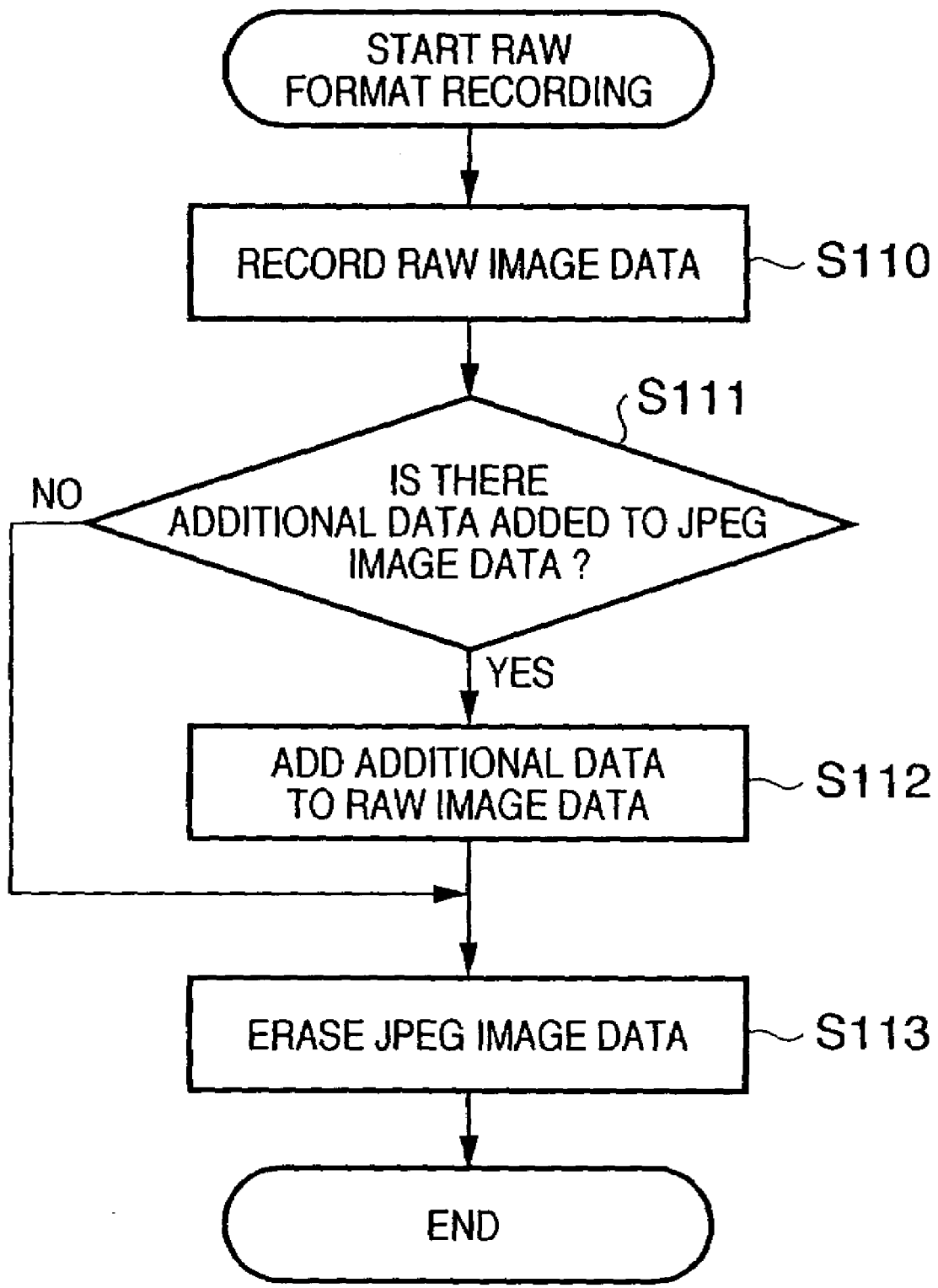
FIG. 7 is a flowchart showing an example of a second RAW format recording process according to a modification of the present invention.

FIG. 7 shows an example of a second RAW format recording process different from the RAW format recording process shown in FIG. 6. The second RAW format recording process here is a process example to be performed in the image sensing apparatus 100 in the case where JPEG data has additional data such as voice data and memo data added thereto when the JPEG image data is erased from a recording medium.

For example, when the second RAW format recording process is started based on a RAW format recording instruction from the operation unit 70 (in the case of "YES" at step S106 in FIG. 6), the system controller 50 first records RAW image data to the recording medium 200 or 210 (step S110). Then, the system controller 50 checks whether additional data such as voice data and memo data is added to JPEG image data corresponding to the RAW image data (step S111).

In this case, if no additional data is added to the JPEG image data (in the case of "NO" at step S111), then the process proceeds to step S113. If any additional data is attached to the JPEG image data (in the case of "YES" at step S111), then the system controller 50 stores the additional data to the recording medium 200 or 210 so as to add the data to the corresponding RAW image data (step S112). Then, at step S113, the system controller 50 erases the JPEG image data from the recording medium 200 or 210 (step S113). In this way, the second RAW format recording process in the image sensing apparatus 100 is completed.

By re-adding additional data added to the JPEG image data to the RAW image data and erasing the JPEG image data corresponding to the RAW image data from the recording medium 200 or 210 after recording the RAW image data to the recording medium 200 or 210, as shown above, it is possible to perform the RAW format recording process without the additional data added to the JPEG image data being lost.

As for additional data added to JPEG image data, it is also possible to enable a user to select one of re-addition of the additional data to RAW image data and erasure thereof together with the JPEG image data. It is, of course, possible to set that additional data should be always erased. If the above-mentioned additional data includes information such as image recording format data, it is necessary to change the image recording format data when the recording format of a sensed image has been changed from JPEG format to RAW format. In this case, the image sensing apparatus 100 may automatically modify a part of the additional data requiring modification (such as image recording format data).

An example of a third RAW format recording process different from the RAW format recording process shown in FIG. 6 is now described with reference to FIG. 8.

Figure 8:
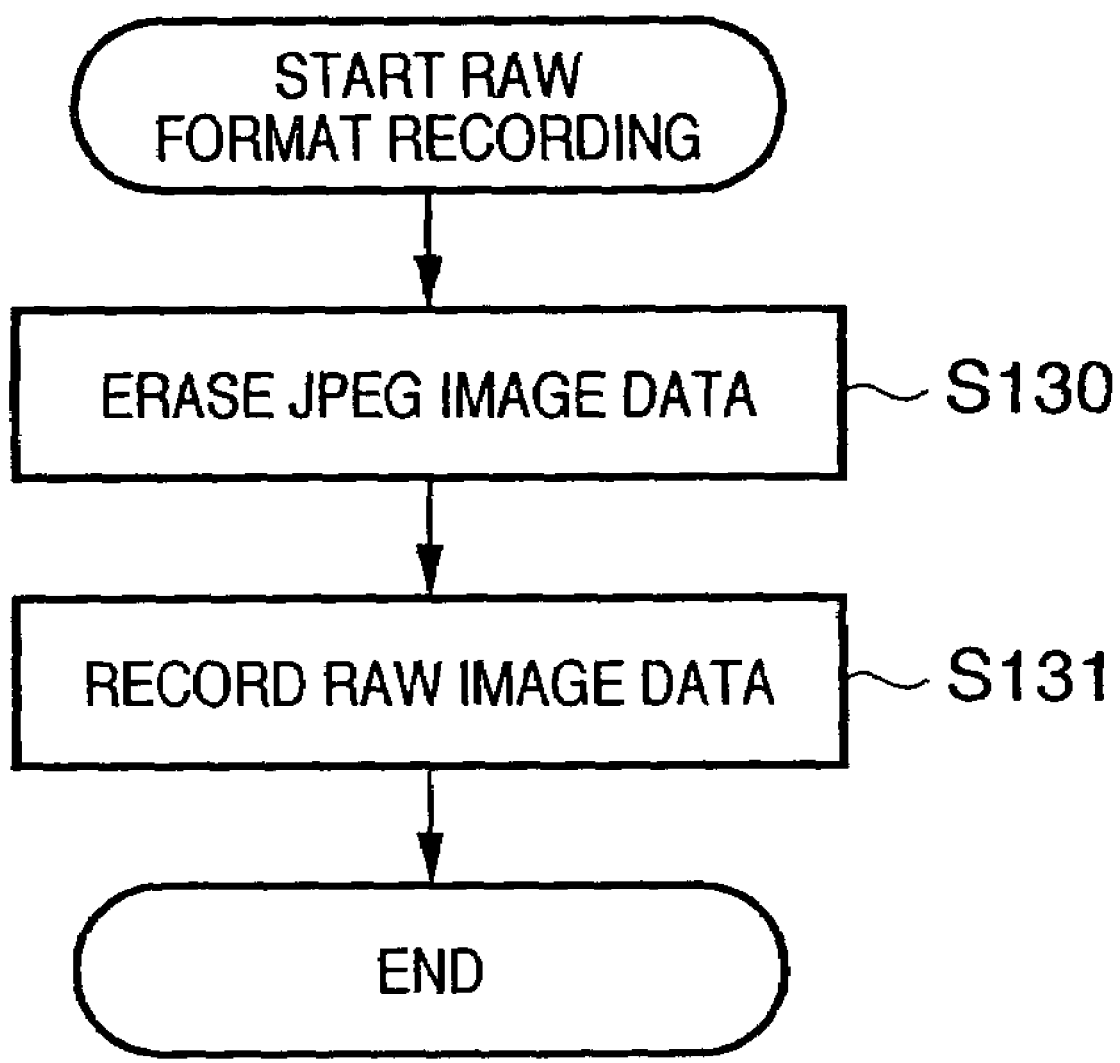
FIG. 8 is a flowchart showing an example of a third RAW format recording process according to a modification of the present invention.

FIG. 8 shows an example of the third RAW format recording process different from the RAW format recording process shown in FIG. 6. The third RAW format recording process here is a process for recording RAW image data to a recording medium after erasing JPEG image data from the recording medium.

For example, when the third RAW format recording process is started based on a RAW format recording instruction from the operation unit 70, the system controller 50 first erases JPEG image data corresponding to RAW image data to be recorded at the next step from the recording medium 200 or 210 (step S130). Then, the system controller 50 records the RAW image data corresponding to the JPEG image data erased at step S130 onto the recording medium 200 or 210 (step S131). In this way, the image sensing apparatus 100 completes the third RAW format recording process.

By recording RAW image data onto the recording medium 200 or 210 after erasing JPEG image data from the recording medium 200 or 210 as shown above, it is possible to prevent fragmentation from being caused in the recording medium 200 or 210 and efficiently utilize the recording medium 200 or 210.

An example of a fourth RAW format recording process different from the RAW format recording process shown in FIG. 6 is now described with reference to FIG. 9.

Figure 9:
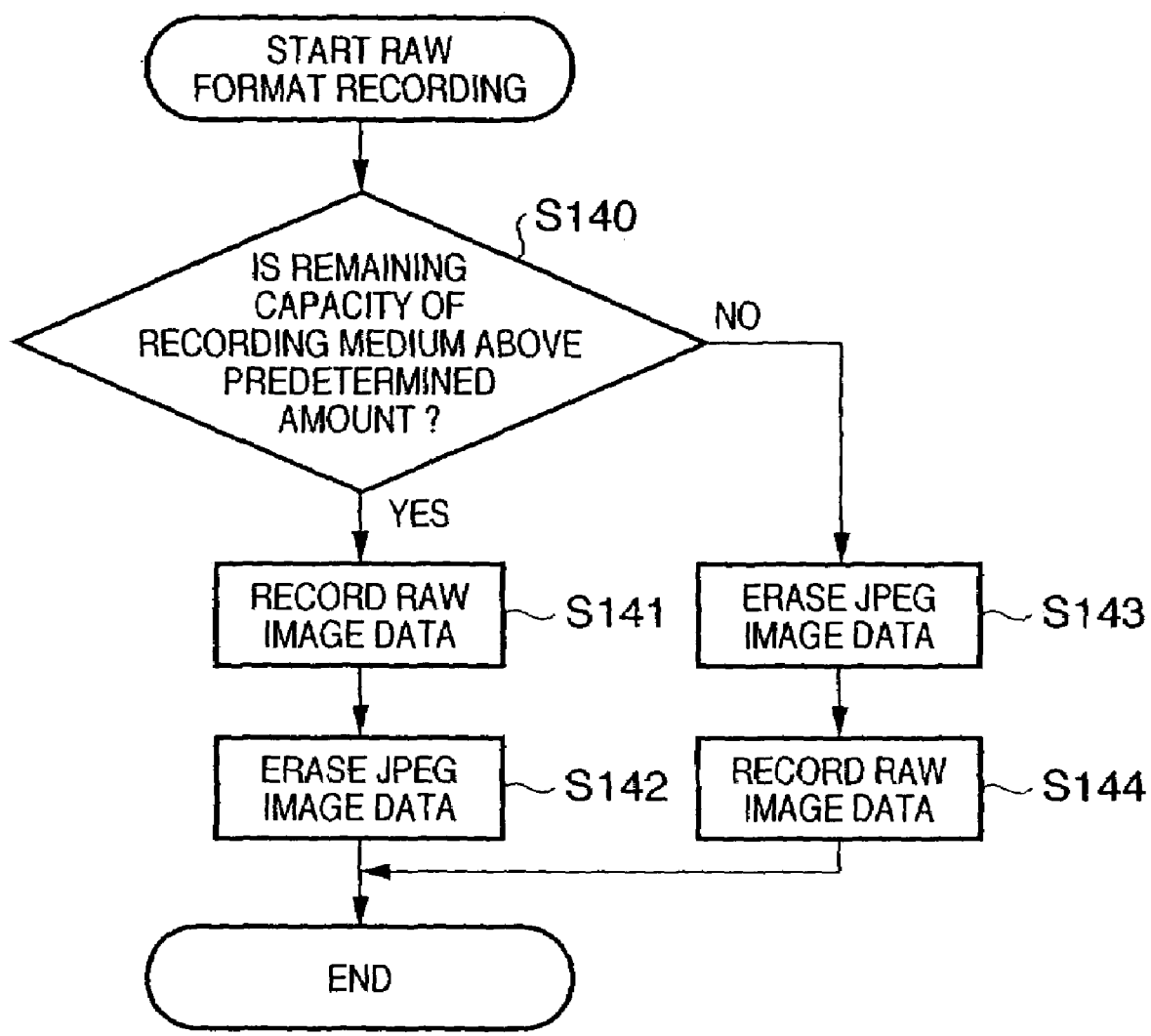
FIG. 9 is a flowchart showing an example of a fourth RAW format recording process according to a modification of the present invention.

FIG. 9 shows an example of the fourth RAW format recording process different from the RAW format recording process shown in FIG. 6. The fourth RAW format recording process here is a process for changing the order of recording of RAW image data to a recording medium and erasing of JPEG image data from the recording medium, based on the remaining capacity of the recording medium.

For example, when the fourth RAW format recording process is started in response to a RAW format recording instruction from the operation unit 70, the system controller 50 first checks the remaining capacity of the recording medium 200 or 210 (step S140). If the remaining capacity of the recording medium 200 or 210 is more than a predetermined amount (in the case of "YES" at step S140), then the system controller 50 records RAW image data onto the recording medium 200 or 210 (step S141). The system controller 50 then erases JPEG image data corresponding to the RAW image data recorded at step S141 from the recording medium 200 or 210 (step S142). In this way, the image sensing apparatus 100 completes the fourth RAW format recording process.

If the remaining capacity of the recording medium 200 or 210 is less than the predetermined amount (in the case of "NO" at step S140), then the system controller 50 erases the JPEG image data from the recording medium 200 or 210 (step S143). The system controller 50 then records the RAW image data to the recording medium 200 or 210 (step S144). In this way, the image sensing apparatus 100 completes the fourth RAW format recording process.

By changing the order of recording of RAW image data to the recording medium 200 or 210 and erasing of JPEG image from the recording medium 200 or 210 based on the remaining capacity of the recording medium 200 or 210 as shown above, it is possible to perform recording to the recording medium 200 or 210, giving priority to safety of image data (giving priority to recording) when there is sufficient capacity left in the recording medium 200 or 210, and giving priority to utilization efficiency of the recording medium 200 or 210 (giving priority to erasure) when there is little capacity left in the recording medium 200 or 210. This enables the image sensing apparatus 100 to efficiently utilize the recording medium 200 or 210 based on the remaining capacity while keeping safety of image data.

In this case, it is possible to enable a user to arbitrarily set the remaining capacity of the recording medium, which is to be a threshold for changing the order of recording of RAW image data to the recording medium 200 or 210 and erasure of JPEG image data from the recording medium 200 or 210. It is also possible to set that the recording process is always performed in either of the orders irrespective of the remaining capacity of the recording medium 200 or 210.

An example a fifth RAW format recording process different from the RAW format recording process shown in FIG. 6 is now described with reference to FIG. 10.

Figure 10:
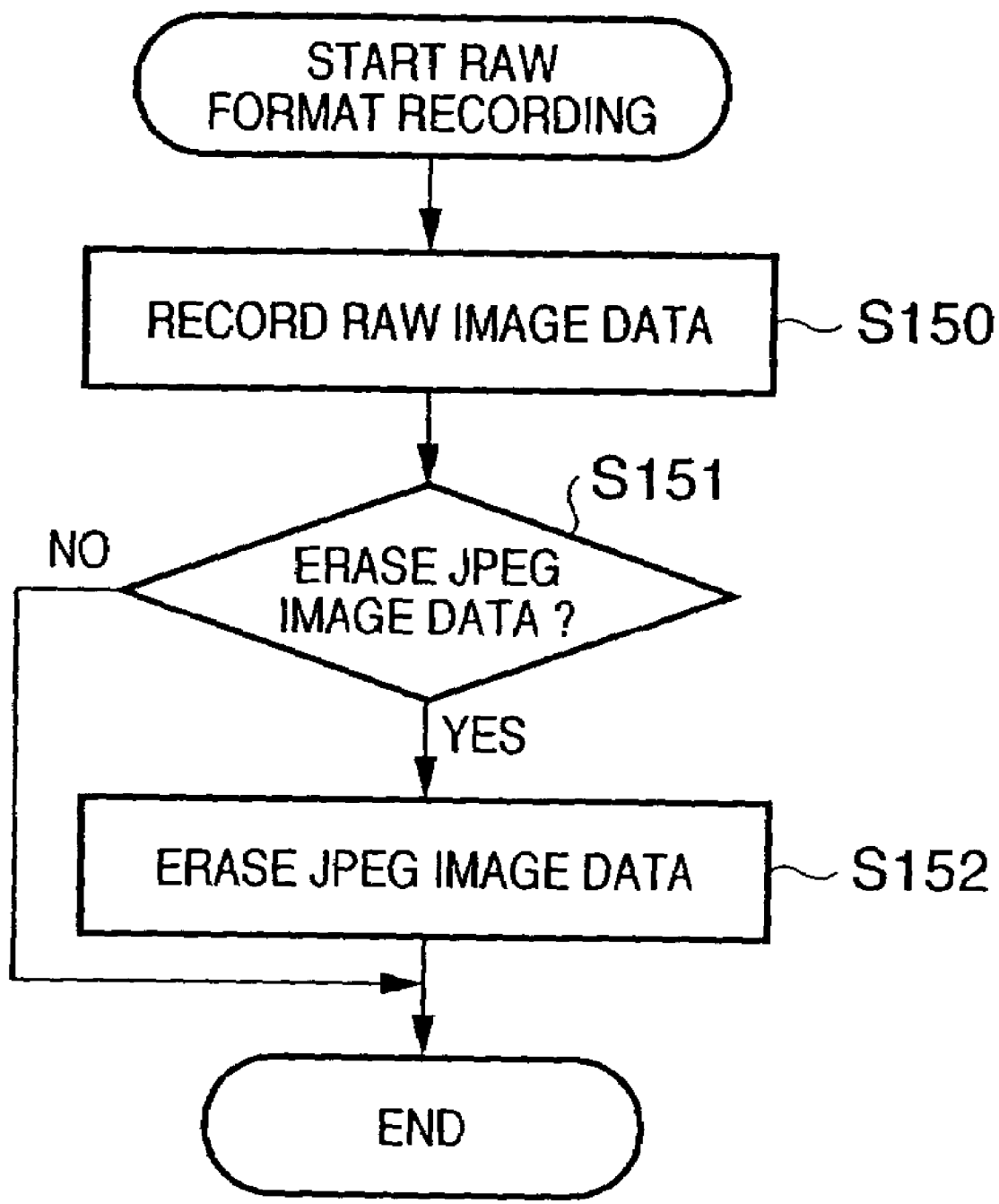
FIG. 10 is a flowchart showing an example of a fifth RAW format recording process according to a modification of the present invention.

FIG. 10 shows an example of the fifth RAW format recording process different from the RAW format recording process shown in FIG. 6. The fifth RAW format recording process here is a process for selecting whether or not to erase JPEG image data from a recording medium after recording RAW image data to the recording medium.

Figure 13:
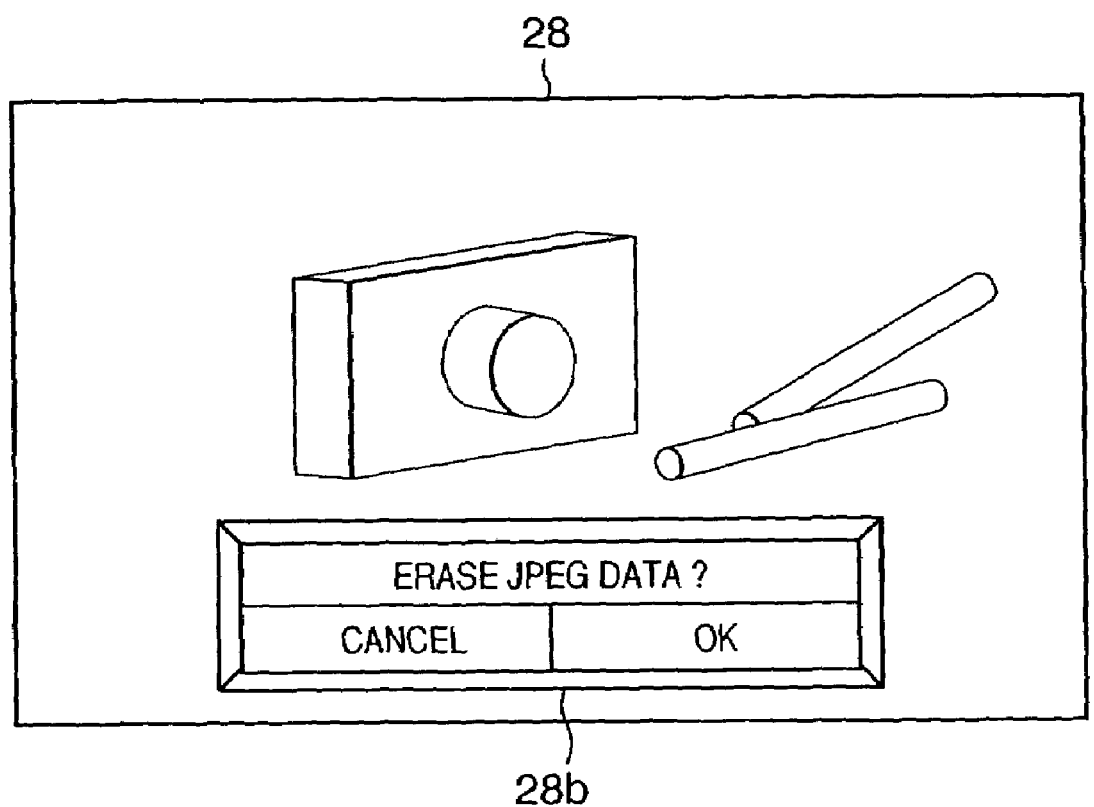
FIG. 13 shows an example of a data erasure selection frame displayed on the image display unit 28 shown in FIG. 5.

For example, when the fifth RAW format recording process is started in response to a RAW format recording instruction from the operation unit 70, the system controller 50 records RAW image data to the recording medium 200 or 210 (step S150). The system controller 50 then displays on the image display unit 28 a data erasure selection frame 28*b* composed of a message display frame for a message "Erase JPEG data?" and selection frames for selecting "Cancel" and "OK" in response to the message as shown in FIG. 13 (step S151). The user is inquired about whether or not to erase JPEG image data from the recording medium through this frame. If "Cancel" of the data erasure selection frame 28b is selected via the operation unit 70 (in the case of "NO" at step S151), then the image sensing apparatus 100 completes the fifth RAW format recording process without erasing the JPEG image data from the recording medium 200 or 210.

On the contrary, if "OK" is selected in the data erasure selection frame 28b via the operation unit 70 (in the case of "YES" at step S151), then the erasure instruction is transferred to the system controller 50, and the system controller 50 erases JPEG image data corresponding to the RAW image data recorded at step S150 from the recording medium 200 or 210 based on the erasure instruction (step S152). That is, the image sensing apparatus 100 controls erasure of the JPEG image data in response to an erasure instruction externally inputted via operation of the operation unit 70. In this way, the image sensing apparatus 100 completes the fifth RAW format recording process.

By enabling a user of the image sensing apparatus 100 to select whether or not to erase JPEG image data from the recording medium 200 or 210, it is possible to record the JPEG image data together with RAW image data to the recording medium 200 or 210 for images for which the user desires to do so when executing the RAW format recording process.

An example of a sixth RAW format recording process different from the RAW format recording process shown in FIG. 6 is now described with reference to FIG. 11.

Figure 11:
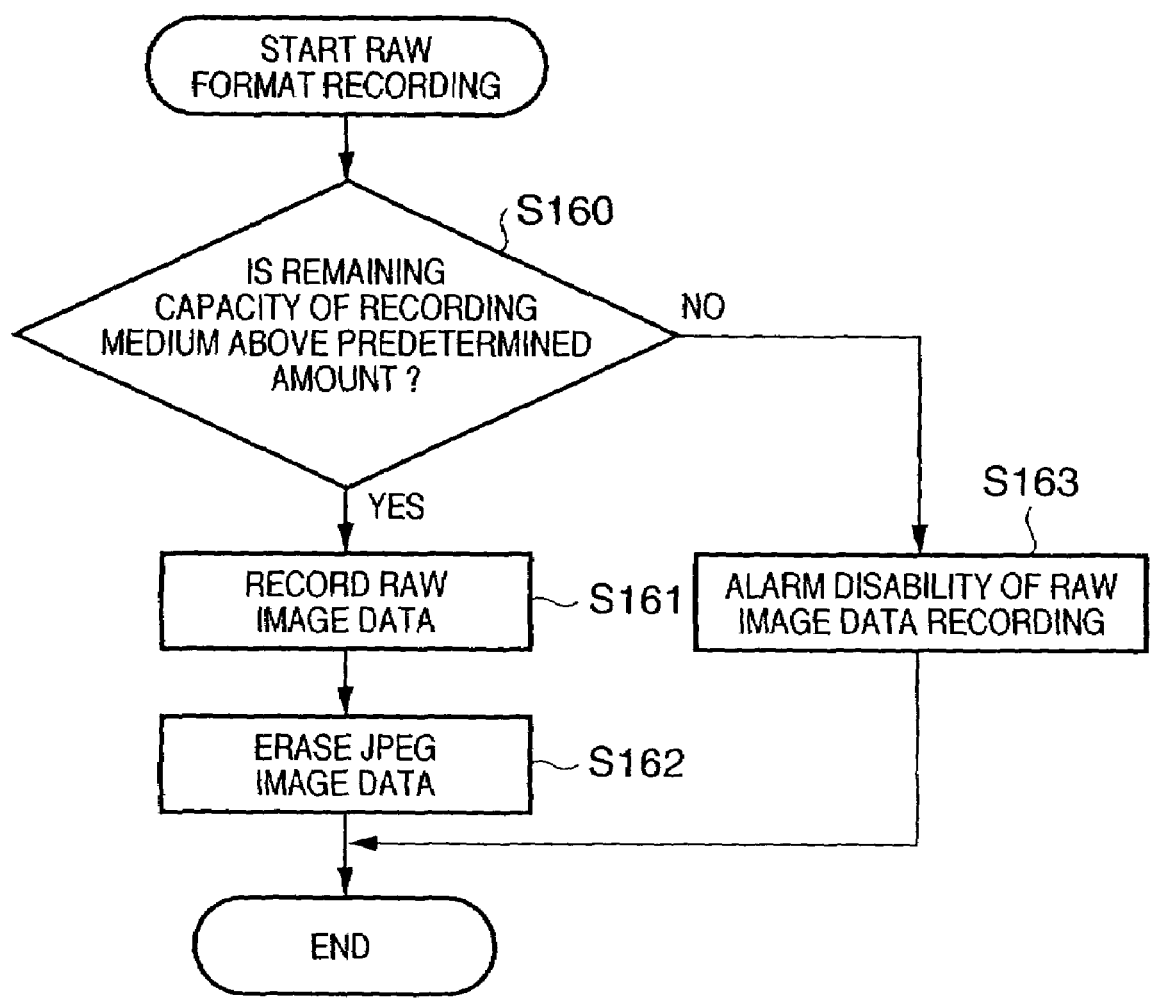
FIG. 11 is a flowchart showing an example of a sixth RAW format recording process according to a modification of the present invention.

FIG. 11 shows an example of the sixth RAW format recording process different from the RAW format recording process shown in FIG. 6. The sixth RAW format recording process here is a process for alarming a user that the available capacity of the recording medium is below the amount required for RAW format recording if such a case occurs when RAW format recording is performed.

For example, when the sixth RAW format recording process is started in response to a RAW format recording instruction from the operation unit 70, the system controller 50 checks the remaining capacity of the recording medium 200 or 210 (step S160). If the remaining capacity of the recording medium 200 or 210 is above a predetermined amount (in the case of "YES" at step S160), then the system controller 50 records RAW image data to the recording medium 200 or 210 (step S161). The system controller 50 then erases JPEG image data from the recording medium 200 or 210 (step S162). In this way, the image sensing apparatus 100 completes the sixth RAW format recording process.

Figure 14:
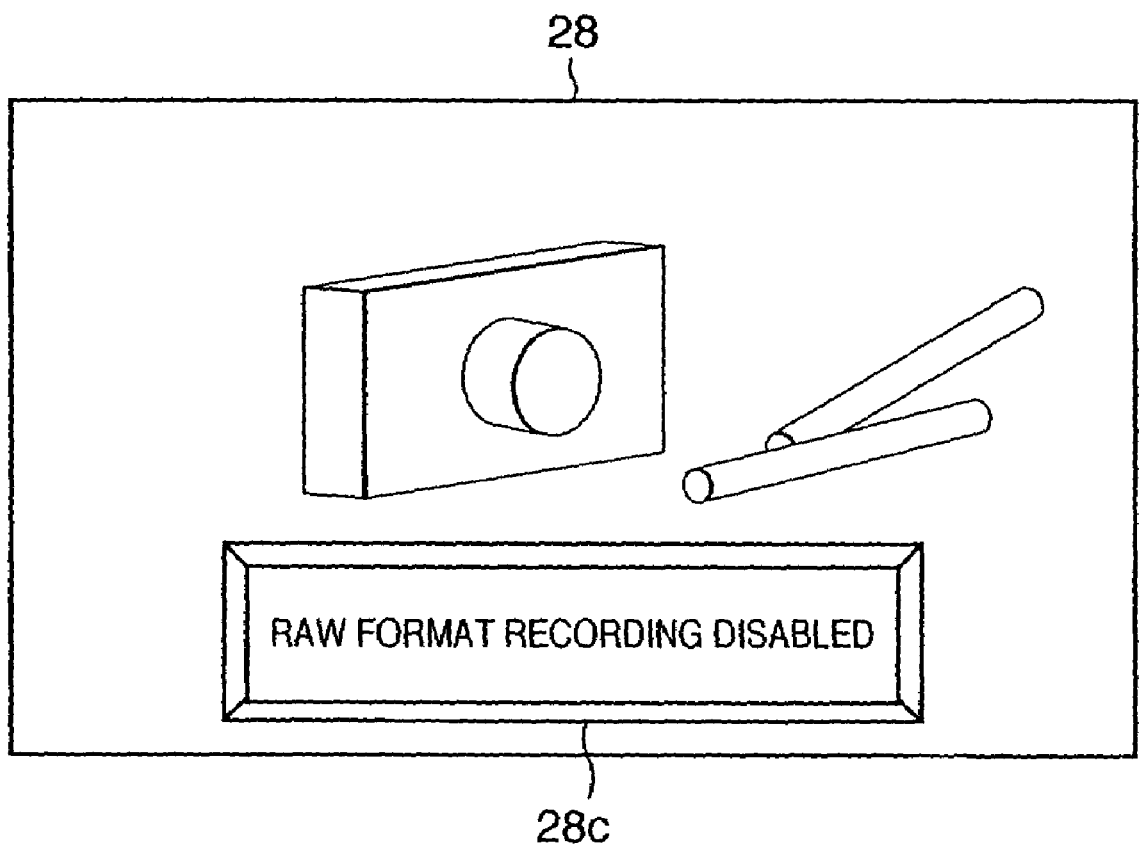
FIG. 14 shows an example of a message display frame displayed on the image display unit 28 shown in FIG. 5.

If the remaining capacity of the recording medium 200 or 210 is below the predetermined amount (in the case of "NO" at step S160), then recording of the RAW image data and erasure of the JPEG image data are not performed, and a message frame 28c is displayed which indicates an alarm, "RAW format recording disabled" (step S163) as shown in FIG. 14. In this way, the image sensing apparatus 100 completes the sixth RAW format recording process. The process enables the image sensing apparatus 100 to alarm the user that RAW format recording is disabled.

Though it was explained that the alarm to the user was issued via the image display unit 28 in the embodiment described above, it is also possible to alarm that RAW format recording is disabled by displaying a message to that effect in an optical viewfinder 104 or by emitting an alarm sound from a speaker provided for the image sensing apparatus 100.

Though JPEG format was used as an example of lossy data compression format in the above description of embodiments, another lossy data compression format may be possible, of course. Though RAW format data was described as a non-data-compression format, it may be a lossless data compression format which does not cause data deterioration, of course.

The embodiments of the present invention have been described in detail with reference to figures. Particular configurations are not limited to the embodiments, and designs which do not depart from the spirit of the present invention should be also included.

Other Embodiment

The present invention can be applied to a system constituted by a plurality of devices (e.g., camera head, interface, image processor) or to an apparatus comprising a single device (e.g., digital still camera).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts in FIGS. 2 and 3 or FIG. 6 or FIG. 6 and FIGS. 7, 8, 9, 10, or 11 described in the embodiments.

The present invention is not limited to the above embodiments and various changes and modifications can be made within the spirit and scope of the present invention. Therefore to apprise the public of the scope of the present invention, the following claims are made.

What is claimed is:

1. An image sensing apparatus comprising:
   an image sensor that performs image sensing in response to an inputted image sensing instruction;
   a recording unit that records a sensed image on a recording medium; and
   a controller that controls to record on said recording medium the sensed image in a first format in addition to the same sensed image in a second format, different from the first format, which is designated in advance, in response to a designation of a format change instruction which is different from said image sensing instruction when the format change instruction is designated by a user within a predetermined period after sensing the image.

2. The image sensing apparatus according to claim 1, wherein
   said controller controls to erase the sensed image in the second format recorded on said recording medium in response to the designation of the format change instruction when the format change instruction is designated by the user within the predetermined period after sensing the image.

3. The image sensing apparatus according to claim 1, wherein the first format is a lossless compression format and the second format is a lossy compression format.

4. The image sensing apparatus according to claim 1 further comprising a memory that stores a sensed image in the first format at least until the format change instruction is designated.

5. The image sensing apparatus according to claim 4, wherein said controller controls the latest image data of the first format stored in said memory to be recorded onto said recording medium in response to the format change instruction.

6. The image sensing apparatus according to claim 1, wherein said controller rejects the format change instruction while an image sensing operation is in progress in response to the image sensing instruction.

7. The image sensing apparatus according to claim 1, wherein said controller displays on a display unit at least one operation status of "Start recording", "Recording", and "Recorded" when recording the sensed image of the first format onto said recording medium.

8. The image sensing apparatus according to claim 1, wherein said controller controls at least one of information indicating whether or not there is any sensed image of the first format which has not been recorded onto said recording medium and information indicating whether or not each sensed image of the first format has been recorded onto said recording medium, and updates the information when a sensed image of the first format is recorded onto said recording medium in response to the format change instruction.

9. The image sensing apparatus according to claim 8, wherein said controller determines whether or not there is any sensed image of the first format recordable onto said recording medium based on the information when the format change instruction is inputted, and prevents a sensed image of the first format from being recorded onto said recording medium when it is determined that there is no recordable sensed image of the first format.

10. The image sensing apparatus according to claim 9 further comprising a notification unit, wherein said controller controls the information to be notified by said notification unit when preventing recording onto said recording medium.

11. The image sensing apparatus according to claim 1, wherein said controller rejects the format change instruction in a case where the second format is a lossless compression format.

12. The image sensing apparatus according to claim 1, wherein, when at least one of a level drop of a power source supplying power to the image sensing apparatus and an operation error in the image sensing apparatus is detected, the format change instruction is automatically issued.

13. The image sensing apparatus according to claim 1, wherein a sensed image is recorded in the second format on said recording medium until at least the format change instruction is issued.

14. The image sensing apparatus according to claim 13, wherein, after the format change instruction is issued, the sensed image of the second format is erased from said recording medium.

15. The image sensing apparatus according to claim 14, wherein said controller controls, when additional data is added to the sensed image of the second format to be erased, the additional data to be added to a corresponding sensed image of the first format.

16. The image sensing apparatus according to claim 14, wherein erasure of the sensed image is performed in accordance with a capacity of said recording medium.

17. The image sensing apparatus according to claim 1, wherein the controller rejects the format change instruction when the capacity of said recording medium is less than a predetermined amount.

18. The image sensing apparatus according to claim 1, wherein the predetermined period is a period until a next image sensing instruction is issued.

19. The image sensing apparatus according to claim 1, wherein the predetermined period is a period when the sensed image is displayed on a display.

20. The image sensing apparatus according to claim 1, wherein the predetermined period is a period when electric power is supplied to the image sensing apparatus.

21. The image sensing apparatus according to claim 1, wherein the first format is a lossy compression format and the second format is a lossless compression format.

22. An image recording method comprising:
    performing image sensing in response to an inputted image sensing instruction; and
    recording on a recording medium the sensed image in a first format in addition to the same sensed image in a second format, different from the first format, which is designated in advance, in response to a designation of a format change instruction which is different from said image sensing instruction when the format change instruction is designated by a user within a predetermined period after sensing the image.

23. The image recording method according to claim 22, wherein
    erasing from said recording medium the sensed image in the second format in response to the designation of the format change instruction when the format change instruction is designated by the user within a predetermined period after sensing the image.

24. The image recording method according to claim 22, wherein the first format is a lossless compression format and the second format is a lossy compression format.

25. The image recording method according to claim 22 further comprising storing in a memory a sensed image in the first format at least until the format change instruction is designated.

26. The image recording method according to claim 22, wherein, upon recording the sensed image in the first format, the latest image data of the first format stored in the memory is recorded onto the recording medium in response to the format change instruction.

27. The image recording method according to claim 22, wherein the format change instruction is invalidated while an image sensing operation is in progress in response to the image sensing instruction.

28. The image recording method according to claim 22 further comprising displaying on a display unit at least one operation status of "Start recording", "Recording", and "Recorded" when recording the sensed image of the first format onto the recording medium.

29. The image recording method according to claim 22, further comprising:
   managing at least one of information indicating whether or not there is any sensed image of the first format which has not been recorded onto the recording medium and information indicating whether or not each sensed image of the first format has been recorded onto the recording medium; and
   updating the information when a sensed image of the first format is recorded onto the recording medium in response to the format change instruction.

30. The image recording method according to claim 29 further comprising:
   determining whether or not there is any sensed image of the first format recordable onto the recording medium based on the information when the format change instruction is inputted; and
   preventing a sensed image of the first format from being recorded onto the recording medium when it is determined that there is no recordable sensed image of the first format.

31. The image recording method according to claim 30 further comprising, when preventing recording onto the recording medium, notifying the information.

32. The image recording method according to claim 22, wherein the format change instruction is rejected in a case where the second format is a lossless compression format.

33. The image recording method according to claim 22 further comprising automatically issuing the format change instruction when at least one of a level drop of a power source supplying power to the image recording method and an operation error in the image recording method is detected.

34. The image recording method according to claim 22, wherein a sensed image is recorded in the second format on the recording medium until at least the format change instruction is issued.

35. The image recording method according to claim 34 further comprising erasing the sensed image of the second format from the recording medium after the format change instruction is issued.

36. The image recording method according to claim 35 further comprising, when additional data is added to the sensed image of the second format to be erased, adding the additional data to a corresponding sensed image of the first format.

37. The image recording method according to claim 35, wherein erasure of the sensed image is performed in accordance with a capacity of the recording medium.

38. The image recording method according to claim 22, wherein the format change instruction is rejected when the capacity of the recording medium is less than a predetermined amount.

39. The image recording method according to claim 22, wherein the predetermined period is a period until a next image sensing instruction is issued.

40. The image recording method according to claim 22, wherein the predetermined period is a period when the sensed image is displayed on a display.

41. The image recording method according to claim 22, wherein the predetermined period is a period when electric power is supplied to the image recording method.

42. The image recording method according to claim 22, wherein the first format is a lossy compression format and the second format is a lossless compression format.

43. A storage medium readable by a data processing apparatus, said storage medium storing a program which is executable by the data processing apparatus and comprises program codes realizing the image recording method described in claim 22.

* * * * *